United States Patent
Li et al.

(10) Patent No.: US 12,532,075 B2
(45) Date of Patent: Jan. 20, 2026

(54) PAN-TILT-ZOOM MODULE, CAMERA MODULE, AND ELECTRONIC DEVICE

(71) Applicant: Huawei Technologies Co., Ltd., Shenzhen (CN)

(72) Inventors: Dengfeng Li, Dongguan (CN); Zhongcheng You, Dongguan (CN); Haibo Wan, Dongguan (CN); Gang Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 233 days.

(21) Appl. No.: 18/263,275

(22) PCT Filed: Dec. 29, 2021

(86) PCT No.: PCT/CN2021/142526
§ 371 (c)(1),
(2) Date: Jul. 27, 2023

(87) PCT Pub. No.: WO2022/161092
PCT Pub. Date: Aug. 4, 2022

(65) Prior Publication Data
US 2024/0098370 A1 Mar. 21, 2024

(30) Foreign Application Priority Data
Jan. 28, 2021 (CN) .................. 202110120467.X

(51) Int. Cl.
H04N 23/68 (2023.01)
H04N 23/55 (2023.01)
(Continued)

(52) U.S. Cl.
CPC ............ *H04N 23/687* (2023.01); *H04N 23/55* (2023.01); *H04N 23/57* (2023.01); *H04N 23/67* (2023.01); *H04N 23/695* (2023.01)

(58) Field of Classification Search
CPC ...... H04N 23/687; H04N 23/55; H04N 23/57; H04N 23/67; H04N 23/695;
(Continued)

(56) References Cited

U.S. PATENT DOCUMENTS

2003/0016300 A1 1/2003 Ting
2013/0002933 A1 1/2013 Topliss et al.
(Continued)

FOREIGN PATENT DOCUMENTS

CN 102770804 A 11/2012
CN 103905704 A 7/2014
(Continued)

*Primary Examiner* — Timothy J Henn
(74) *Attorney, Agent, or Firm* — Conley Rose, P.C.

(57) ABSTRACT

A pan-tilt-zoom device includes a housing, a carrier, an image sensor, and a shape memory alloy (SMA) motor. An accommodating cavity is formed in the housing, and a first opening in communication with the accommodating cavity is provided on the housing. The carrier is located in the accommodating cavity, the carrier has a lens mounting hole, and an opening at one end of the lens mounting hole faces the first opening. The image sensor is located in the accommodating cavity and is disposed on a side that is of the carrier and that is away from the first opening, and a photosensitive surface of the image sensor faces an opening at the other end of the lens mounting hole. The SMA motor is configured to drive the carrier to tilt in the accommodating cavity along with the image sensor in any direction around, to implement optical image stabilization.

20 Claims, 27 Drawing Sheets

(51) Int. Cl.
  *H04N 23/57*   (2023.01)
  *H04N 23/67*   (2023.01)
  *H04N 23/695*  (2023.01)

(58) Field of Classification Search
  CPC .. H04N 23/6812; H04N 23/54; H04N 23/685; G03B 3/00; G03B 2205/0046; G03B 2205/0069; G03B 5/00; G03B 30/00; F16M 11/043; F16M 11/12; F16M 11/18
  See application file for complete search history.

(56) References Cited

U.S. PATENT DOCUMENTS

| | | | |
|---|---|---|---|
| 2016/0209670 A1* | 7/2016 | Brown | G02B 27/646 |
| 2018/0041709 A1* | 2/2018 | Konttori | H04N 23/57 |
| 2019/0373174 A1 | 12/2019 | Ba-Tis et al. | |
| 2020/0036898 A1 | 1/2020 | Kuo et al. | |
| 2020/0192187 A1* | 6/2020 | Lee | H02K 41/0356 |
| 2020/0409167 A1* | 12/2020 | Zhang | G03B 3/10 |
| 2021/0382320 A1* | 12/2021 | Brown | G03B 13/34 |
| 2022/0206363 A1* | 6/2022 | Yan | G03B 30/00 |
| 2023/0213728 A1* | 7/2023 | Brown | G03B 13/36 359/557 |
| 2023/0296961 A1* | 9/2023 | Brown | G03B 5/00 359/554 |

FOREIGN PATENT DOCUMENTS

| | | |
|---|---|---|
| CN | 207114854 U | 3/2018 |
| CN | 207926712 U | 9/2018 |
| CN | 109856891 A | 6/2019 |
| CN | 110554474 A | 12/2019 |
| CN | 210442607 U | 5/2020 |
| CN | 111665677 A | 9/2020 |
| CN | 111885290 A | 11/2020 |
| CN | 212413285 U | 1/2021 |
| JP | 2017207734 A | 11/2017 |

* cited by examiner

PAN-TILT-ZOOM MODULE, CAMERA MODULE, AND ELECTRONIC DEVICE

This is a National Stage of International Patent Application No. PCT/CN2021/142526 filed on Dec. 29, 2021, which claims priority to Chinese Patent Application No. 202110120467.X filed on Jan. 28, 2021. Both of the aforementioned applications are hereby incorporated by reference in their entireties.

TECHNICAL FIELD

This application relates to the field of electronic device technologies, and in particular, to a pan-tilt-zoom module, a camera module, and an electronic device.

BACKGROUND

Currently, photos or videos shot by an electronic device like a mobile phone, a tablet computer, or a personal computer (personal computer, PC) sometimes become out of focus, that is, shot images involved are not clear enough, resulting in ghost or blurred imaging. This is partly because a handheld electronic device shakes slightly during photographing.

Currently, an optical image stabilization (optical image stabilization, OIS) component is integrated into a camera module of a high-end electronic device to improve image clarity. The OIS component is configured to drive a lens to tilt or move in a reverse direction of a shake direction of the electronic device, to compensate for a shake displacement, thereby improving clarity of a shot image. An important research focus of manufacturers on this type of camera module is how to increase an image stabilization angle, to meet an image stabilization requirement of a user who handholds the electronic device and performs large-scale motion (for example, fast walking, running, or cycling), and how to reduce the entire camera module in size for mounting in the electronic device with limited internal space.

SUMMARY

Embodiments of this application provide a pan-tilt-zoom module, a camera module, and an electronic device, to implement optical image stabilization, increase an image stabilization angle, and reduce a size of the camera module.

To achieve the foregoing objectives, the following technical solutions are used in embodiments of this application.

According to a first aspect, some embodiments of this application provide a pan-tilt-zoom module. The pan-tilt-zoom module includes a housing, a carrier, an image sensor, and an SMA motor. An accommodating cavity is formed in the housing, and a first opening in communication with the accommodating cavity is provided on the housing. The carrier is located in the accommodating cavity, the carrier has a lens mounting hole, and an opening at one end of the lens mounting hole faces the first opening. The image sensor is located in the accommodating cavity and is disposed on a side that is of the carrier and that is away from the first opening, and a photosensitive surface of the image sensor faces an opening at the other end of the lens mounting hole. The SMA motor is configured to drive the carrier to tilt in the accommodating cavity along with the image sensor in any direction around, to implement optical image stabilization.

In the pan-tilt-zoom module provided in embodiments of this application, the carrier tilts in the accommodating cavity along with the image sensor in any direction around, to implement optical image stabilization. Therefore, a lens fastened to the carrier can be prevented from tilting relative to the image sensor in an optical image stabilization process. In this way, an image stabilization angle does not affect image clarity, and therefore, large-angle image stabilization can be implemented. In addition, a structure for driving the carrier to tilt along with the image sensor in any direction around is an SMA motor, and the SMA motor has a compact structure and strong driving force. Therefore, sizes of the pan-tilt-zoom module and the camera module can be reduced.

In a possible implementation of the first aspect, the SMA motor is an 8-wire SMA motor. The 8-wire SMA motor has a simple structure, which helps simplify the structure of the pan-tilt-zoom module.

In a possible implementation of the first aspect, the pan-tilt-zoom module further includes a circuit board and an electrical connection structure. The image sensor is borne on the circuit board, and the image sensor is fastened relative to the circuit board. The electrical connection structure is a flexible structure. The electrical connection structure has a first end and a second end, where the first end of the electrical connection structure is electrically connected to the circuit board, and the second end of the electrical connection structure is located outside the housing. The electrical connection structure includes a bending section that extends in a first direction and arches in a second direction, where the bending section is in a free state, the first direction is parallel to an axial direction of the lens mounting hole, and the second direction is perpendicular to the first direction. The bending section enables the circuit board to flexibly swing around a first axis, where the first axis is perpendicular to both the first direction and the second direction. At least one side edge of the bending section includes a first bending unit that extends in the second direction and arches in a third direction, where the third direction is perpendicular to the first direction, and the third direction is perpendicular to the second direction. The first bending unit enables the circuit board to flexibly swing around a second axis, where the second axis is parallel to the second direction, and the second axis is perpendicular to the first axis, so that the circuit board can swing in any direction around. In addition, the first bending unit extends in a plane perpendicular to the first direction. Therefore, the first bending unit does not increase a height of the electrical connection structure in the first direction. Therefore, the electrical connection structure includes only one bending section extending in the first direction, so as to achieve an objective of not interfering with the circuit board tilting in any direction around. Therefore, the electrical connection structure has a low height in the first direction. When the bending section is mounted on a side that is of the circuit board and that is away from the carrier, a height of the pan-tilt-zoom module in the first direction is less affected. In this way, the bending section can be mounted on the side that is of the circuit board and that is away from the carrier, so that the bending section can be protected by using the housing of the pan-tilt-zoom module, and there is no need to additionally dispose a protective housing. In addition, a board area occupied by the pan-tilt-zoom module on a mainboard can be reduced.

In a possible implementation of the first aspect, the circuit board and the bending section are located in the accommodating cavity, the bending section is located on a side that is of the circuit board and that is away from the carrier, and an orthographic projection region of the bending section on the circuit board overlaps the circuit board. In this way, the bending section can be protected by using the housing of the pan-tilt-zoom module, and there is no need to additionally dispose a protective housing. In addition, the board area occupied by the pan-tilt-zoom module on the mainboard can be reduced.

In a possible implementation of the first aspect, the orthographic projection region of the bending section on the circuit board is located in the circuit board. In this way, the board area occupied by the pan-tilt-zoom module on the mainboard can be further reduced.

In a possible implementation of the first aspect, orthographic projection regions of two side edges of the bending section on the circuit board do not overlap. In this way, on the premise of a specific height of the bending section in the first direction, a movement angle of a first side edge relative to a second side edge can be increased, and an amplitude of the circuit board swinging around the first axis can be increased. On the premise of a specific movement angle of the first side edge relative to the second side edge, the height of the bending section in the first direction can be further reduced.

In a possible implementation of the first aspect, the first bending unit is disposed on a side edge that is of the bending section and that is away from the carrier. The side edge that is of the bending section and that is away from the carrier further includes a second bending unit. The second bending unit and the first bending unit are disposed in parallel, and the second bending unit protrudes in a reverse direction of the third direction. In this way, the second bending unit does not interfere with the circuit board flexibly swinging around the second axis, and signal transmission between the first end and the second end is implemented through two parallel electrical connection paths of the first bending unit and the second bending unit. This helps reduce a set width of a single electrical connection path, to further improve twistability performance of the electrical connection structure.

In a possible implementation of the first aspect, the second bending unit and the first bending unit are symmetrically disposed. In this way, aesthetics of the electrical connection structure can be improved, and difficulty in manufacturing the electrical connection structure can be reduced.

In a possible implementation of the first aspect, the pan-tilt-zoom module further includes a base body and a focus adjustment component. The base body is located on the side that is of the carrier and that is away from the first opening, the image sensor is fastened to the base body, and the SMA motor is connected between the base body and the housing. The focus adjustment component is connected between the carrier and the base body, and the focus adjustment component is configured to drive the carrier to move in the axial direction of the lens mounting hole relative to the base body. In this way, the pan-tilt-zoom module integrates both an optical image stabilization function and an auto focus function, which helps increase an oblique photographing angle of the camera module.

In a possible implementation of the first aspect, the pan-tilt-zoom module further includes a first elastic structure. The first elastic structure is connected between the carrier and the base body, and the first elastic structure elastically supports the carrier on the base body. In this way, after one auto focus operation, the first elastic structure can be used to reset the carrier to an initial location, so that a next focus operation is not affected.

In a possible implementation of the first aspect, the first elastic structure includes a first elastic part and a second elastic part. The first elastic part is connected between an end that is of the carrier and that is close to the first opening and the base body. The second elastic part is connected between an end that is of the carrier and that is away from the first opening and the base body. In this way, the first elastic structure including the first elastic part and the second elastic part elastically supports the end that is of the carrier and that is close to the first opening and the end that is of the carrier and that is away from the first opening on the base body separately, so that when the base body tilts in any direction around, the carrier can be prevented from tilting relative to the base body under an action of a self-weight and load bearing, thereby improving support stability of the carrier on the base body.

In a possible implementation of the first aspect, the first elastic part includes a first fastening portion and at least two first elastic arm portions. The first fastening portion is fastened to the end that is of the carrier and that is close to the first opening. The at least two first elastic arm portions are evenly arranged along a circumference of the carrier, one end of each of the at least two first elastic arm portions is connected to the first fastening portion, and the other end of each of the at least two first elastic arm portions is fastened relative to the base body. The first elastic part has a simple structure and preferred elastic support stability.

In a possible implementation of the first aspect, the pan-tilt-zoom module further includes a second elastic structure. The second elastic structure is connected between the base body and the housing, and the second elastic structure elastically supports the base body in the housing. In this way, after one optical image stabilization operation, the second elastic structure can be used to drive the base body to be reset to the initial location, so that a next optical image stabilization operation is not affected.

In a possible implementation of the first aspect, the first elastic part further includes at least two second elastic arm portions. The at least two second elastic arm portions are evenly arranged along the circumference of the carrier. One end of each of the at least two second elastic arm portions is connected to the first fastening portion, and the other end of each of the at least two second elastic arm portions is fastened relative to the housing. The first elastic part forms the second elastic structure. In this way, the second elastic structure and the first elastic part are integrated, so that a quantity of components of the pan-tilt-zoom module can be reduced, structural complexity and assembling difficulty of the pan-tilt-zoom module can be reduced, and assembling efficiency of the pan-tilt-zoom module can be improved.

In a possible implementation of the first aspect, the pan-tilt-zoom module further includes an enclosure unit. The enclosure unit is fastened to the base body. The carrier, the focus adjustment component, and the first elastic structure are located in the enclosure unit, and the second elastic structure is located outside the enclosure unit and is connected between the enclosure unit and the housing. In this way, the first elastic structure and the second elastic structure are different mechanical parts. When the carrier moves relative to the base body in the axial direction of the lens mounting hole to implement auto focus, the first elastic structure is bent and deformed, and locations of the second elastic structure relative to the base body and a bottom plate remain unchanged. When the base body tilts in any direction around to implement image stabilization compensation, locations of the first elastic structure relative to the carrier and the base body remain unchanged, and the second elastic structure is twisted. Therefore, there is no cross impact between auto focus motion and image stabilization compensation motion, and even if a loop closing detection apparatus is not disposed, high-precision auto focus driving and high-precision image stabilization compensation driving can be achieved.

In a possible implementation of the first aspect, the housing includes a bottom plate and a cover body. The cover body includes a top plate and a side plate, the first opening is disposed on the top plate, the side plate is peripherally disposed around edges of the top plate, the side plate and the top plate enclose the accommodating cavity, and an edge that is of the side plate and that is away from the top plate is fastened to the bottom plate. The housing of this structure is formed by assembling two structures of the bottom plate and the cover body, which can give consideration to both forming difficulty and assembling difficulty of the housing.

In a possible implementation of the first aspect, a forming material of the bottom plate is metal. In this way, a thickness of the bottom plate may be set to a small value, which helps reduce a height of the pan-tilt-zoom module in the axial direction of the lens mounting hole.

In a possible implementation of the first aspect, the pan-tilt-zoom module further includes at least two support posts. The at least two support posts are disposed in the accommodating cavity and are evenly arranged along a circumference of the carrier, a forming material of the at least two support posts is plastic, the at least two support posts are formed on the bottom plate in an in-mold injection molding process, and an end that is of the SMA motor and that is connected to the housing is connected to the support post. In this way, the support post and the bottom plate are integrated as a whole, so that a quantity of components of the pan-tilt-zoom module can be reduced, and assembling difficulty can be reduced.

In a possible implementation of the first aspect, the bottom plate includes a bottom plate body and at least two fastening posts disposed on the bottom plate body. The at least two fastening posts extend in a direction close to the top plate, and the at least two support posts are formed in an in-mold injection molding process and wrapped outside the at least two fastening posts. In this way, a contact area between the support post and the bottom plate is large, and connection stability is better.

According to a second aspect, some embodiments of this application provide a camera module. The camera module includes a lens and the pan-tilt-zoom module according to any one of the foregoing technical solutions. The lens is mounted in a lens mounting hole of the pan-tilt-zoom module, a light inlet end of the lens is located in a first opening, there is an avoidance gap between the light inlet end of the lens and an edge of a housing at the first opening, and an end face of a light outlet end of the lens is opposite to a photosensitive surface of an image sensor of the pan-tilt-zoom module.

The camera module provided in embodiments of this application includes the pan-tilt-zoom module according to any one of the foregoing technical solutions. Therefore, the camera module and the pan-tilt-zoom module can resolve a same technical problem and achieve same technical effect.

According to a third aspect, some embodiments of this application provide an electronic device. The electronic device includes a shake detection unit, a calculation control unit, and the camera module according to the foregoing technical solutions. The shake detection unit is configured to detect shake information of the electronic device.

The calculation control unit is electrically connected to the shake detection unit, and the calculation control unit is electrically connected to the camera module. The calculation control unit is configured to calculate an image stabilization compensation amount based on the shake information detected by the shake detection unit, and control, based on the image stabilization compensation amount, an SMA motor of the camera module to drive a lens to perform a tilting movement along with an image sensor.

The electronic device provided in embodiments of this application includes the camera module according to the foregoing technical solutions. Therefore, the electronic device and the camera module can resolve a same technical problem and achieve same technical effect.

DESCRIPTION OF EMBODIMENTS

Terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

In embodiments of this application, a term "include" or any other variant thereof is intended to cover a non-exclusive inclusion, so that a process, a method, an article, or an apparatus that includes a series of elements not only includes those elements but also includes other elements that are not expressly listed, or further includes elements inherent to the process, the method, the article, or the apparatus. An element preceded by "includes a . . . " does not, without more constraints, preclude the existence of additional identical elements in the process, the method, the article, or the apparatus that includes the element.

This application provides an electronic device. The electronic device is a type of electronic device having a photographing function. Specifically, the electronic device may be a portable electronic apparatus or another appropriate electronic apparatus. For example, the electronic device may be a mobile phone, a tablet computer, a personal computer, a wearable device, a camera, a video camera, or the like.

Figure 1A:
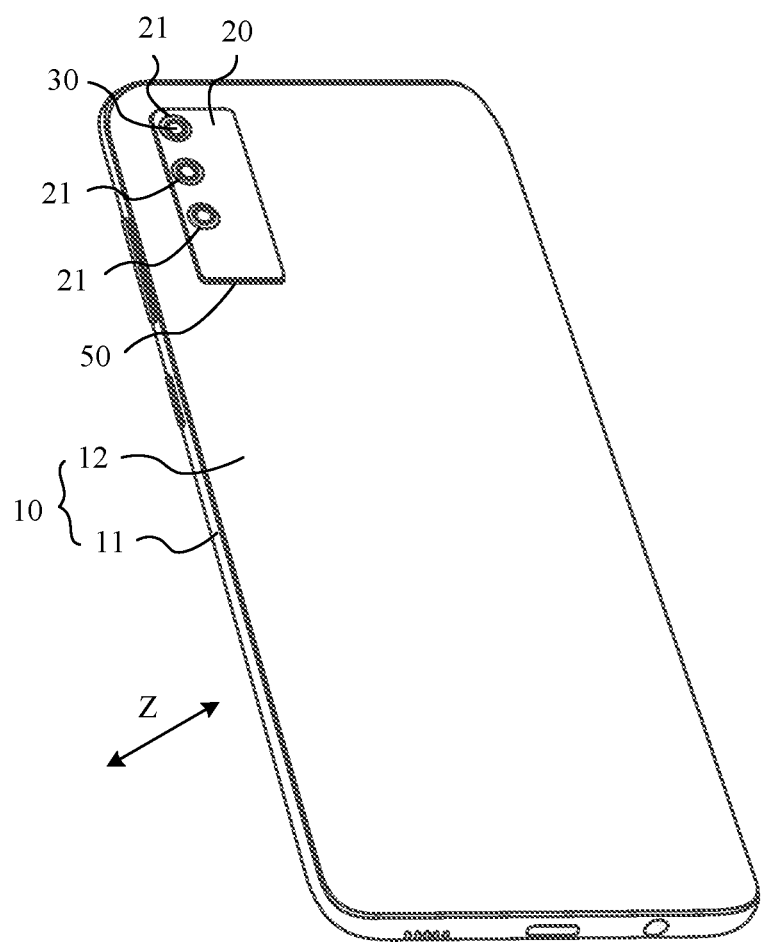
FIG. 1A is a three-dimensional diagram of an electronic device according to some embodiments of this application.
Figure 1B:
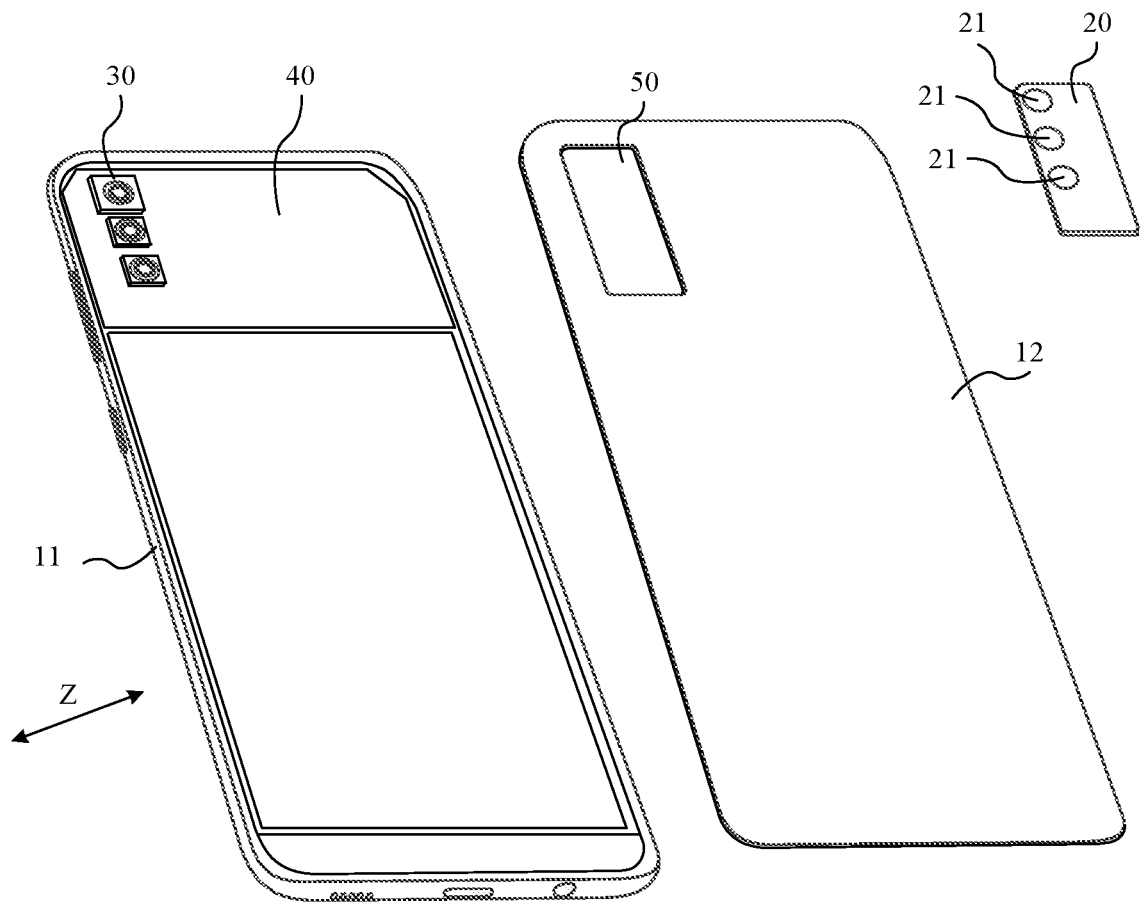
FIG. 1B is an exploded view of the electronic device shown in FIG. 1A.

FIG. 1A is a three-dimensional diagram of an electronic device according to some embodiments of this application. FIG. 1B is an exploded view of the electronic device shown in FIG. 1A. In this embodiment, the electronic device is a mobile phone. The electronic device includes an enclosure 10, a camera decoration cover 20, a camera module 30, and a mainboard 40.

The enclosure 10 is an enclosure structure formed by splicing a front cover (not shown in the figure), a bezel 11, and a rear cover 12, and is configured to protect an internal electronic component and an internal circuit of the electronic device.

A mounting port 50 is provided on the rear cover 12, the camera decoration cover 20 covers the mounting port 50, and the camera decoration cover 20 is configured to protect a rear-facing camera module of the electronic device. In some embodiments, the camera decoration cover 20 protrudes outside the enclosure 10. In this way, the camera decoration cover 20 can increase mounting space of the rear-facing camera module in the electronic device in a thickness direction (namely, a direction Z) of the electronic device. It may be understood that the camera decoration cover 20 may alternatively not protrude outside the enclosure 10. At least one light transmission window 21 is provided on the camera decoration cover 20, and the at least one light transmission window 21 is configured to allow light of a scene to be emitted into the rear-facing camera module.

The camera module 30 is disposed in the enclosure 10, the camera module 30 is configured to capture a photo/video, and the camera module has an optical image stabilization function. There may be one or more camera modules 30 in the electronic device. When there is one camera module 30, the camera module 30 may be used as a front-facing camera module, or may be used as a rear-facing primary camera module or a rear-facing secondary camera module. The rear-facing secondary camera module includes but is not limited to a wide-angle camera module, a long-focus camera module, and the like. This is not specifically limited herein. When there are a plurality of camera modules 30, the plurality of camera modules 30 may be separately used as a plurality of camera modules in the front-facing camera module, the rear-facing primary camera module, and the rear-facing secondary camera module. FIG. 1A and FIG. 1B merely show an example in which there is one camera module 30 and the camera module 30 is used as the rear-facing primary camera module. This cannot be considered as a special limitation on this application.

Figure 1C:
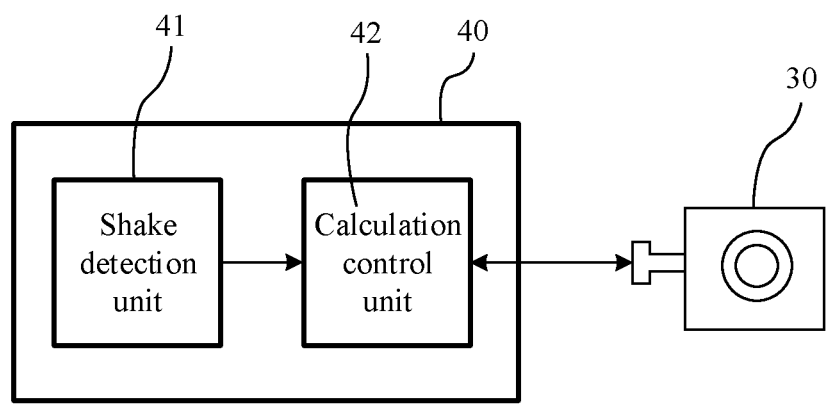
FIG. 1C is an internal circuit diagram of the electronic device shown in FIG. 1A and FIG. 1B.

FIG. 1C is an internal circuit diagram of the electronic device shown in FIG. 1A and FIG. 1B. In this embodiment, the electronic device further includes a shake detection unit 41 and a calculation control unit 42. In some embodiments, the shake detection unit 41 and the calculation control unit 42 are disposed on the mainboard 40. It may be understood that the shake detection unit 41 and the calculation control unit 42 may alternatively be disposed on another structure in the electronic device, for example, disposed on a circuit board in which a universal serial bus (universal serial bus, USB) device is located. FIG. 1B merely shows an example in which the shake detection unit 41 and the calculation control unit 42 are disposed on the mainboard 40. This cannot be considered as a special limitation on this application.

Figure 2:
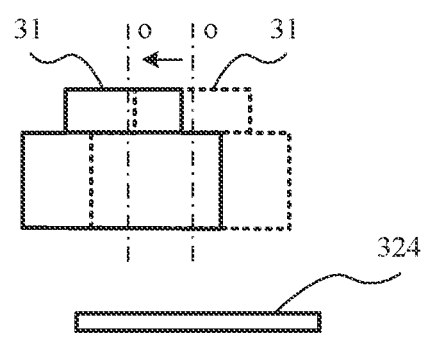
FIG. 2 is a schematic diagram of a structure of a camera module in the electronic device shown in FIG. 1A to FIG. 1C during shift compensation.
Figure 3:
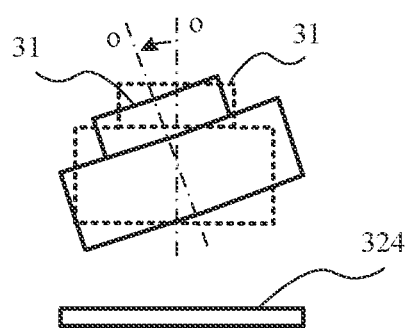
FIG. 3 is a schematic diagram of a structure of a camera module in the electronic device shown in FIG. 1A to FIG. 1C during tilt compensation.

The shake detection unit 41 is configured to detect shake information of the electronic device. In some embodiments, the shake detection unit 41 is a gyroscope (gyro). The shake detection unit 41 is electrically connected to the calculation control unit 42, and the calculation control unit 42 is electrically connected to the camera module 30. In some embodiments, the calculation control unit 42 is a microprocessor. The calculation control unit 42 is configured to: receive and process an electrical signal that is from the camera module 30 and includes image information. The calculation control unit 42 is further configured to: calculate, based on the shake information obtained by the shake detection unit 41, a motion compensation amount (namely, an image stabilization compensation amount) in a reverse direction of a shake direction, and control and drive, based on the image stabilization compensation amount, a lens 31 of the camera module 30 to move (refer to FIG. 2 or FIG. 3), to implement an optical image stabilization operation.

Figure 4A:
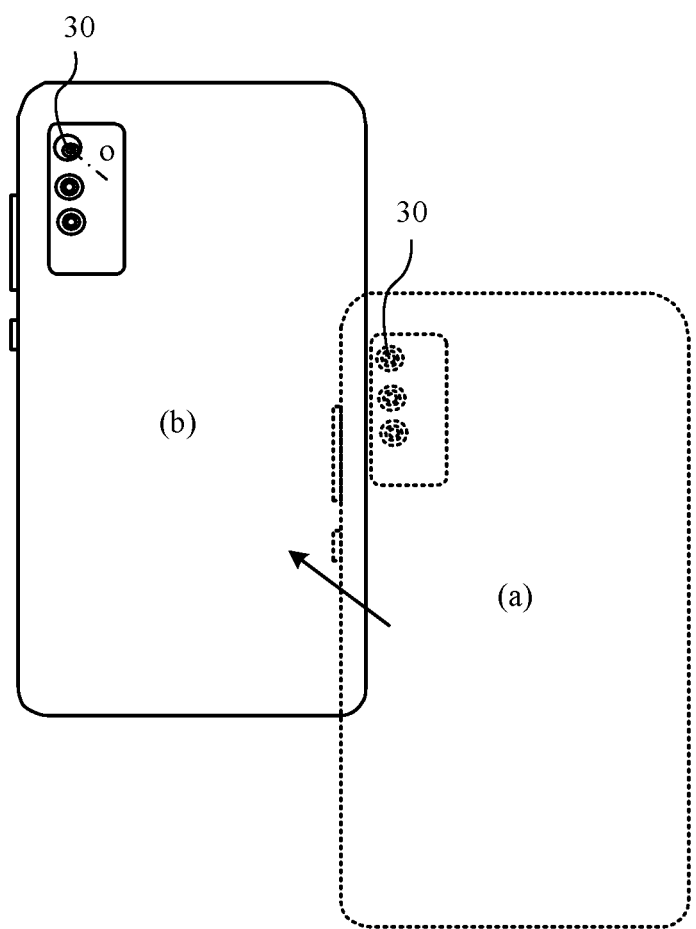
FIG. 4A is a schematic diagram of a structure of an electronic device used when the electronic device shakes to the upper left according to some embodiments of this application.
Figure 4B:
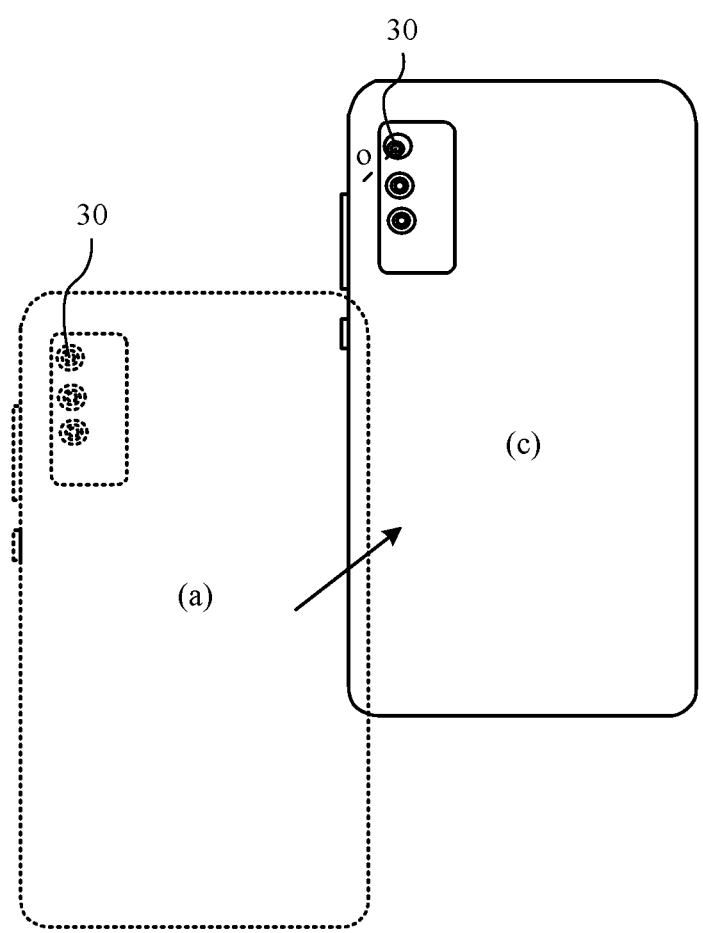
FIG. 4B is a schematic diagram of a structure of an electronic device used when the electronic device shakes to the upper right according to some embodiments of this application.
Figure 4C:
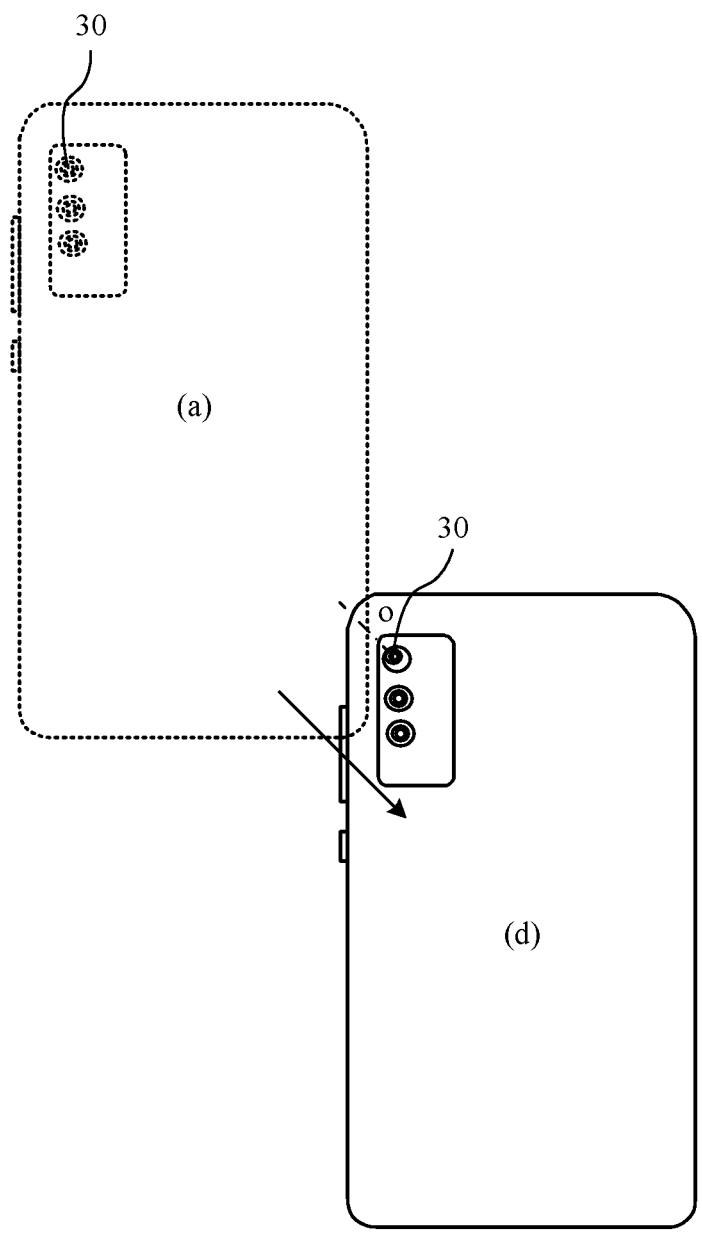
FIG. 4C is a schematic diagram of a structure of an electronic device used when the electronic device shakes to the lower right according to some embodiments of this application.
Figure 4D:
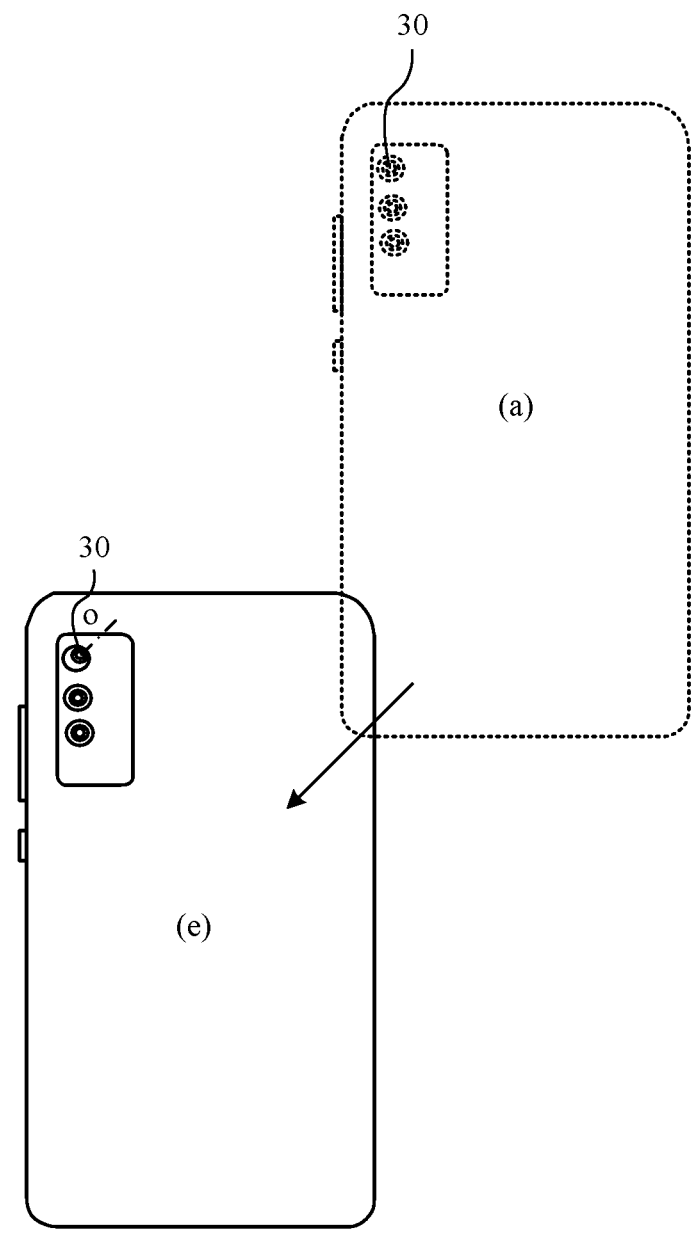
FIG. 4D is a schematic diagram of a structure of an electronic device used when the electronic device shakes to the lower left according to some embodiments of this application.

In an image stabilization process, compensation motions of the lens 31 include two types: shift (shift) and tilt (tilt). The shift compensation motion is that the lens 31 shifts in a plane perpendicular to an optical axis o of the lens 31 (refer to FIG. 2), and the tilt compensation motion is that the lens 31 tilts around (refer to FIG. 3). On a premise of a specific shake amplitude, a distance between the electronic device and a photographed scene is long, and a small tilt angle of the lens 31 can meet an image stabilization requirement. Therefore, compared with the shift compensation motion, the tilt compensation motion can implement a larger angle of image stabilization. It can be learned that, currently, the electronic device usually selects the tilt compensation motion to implement image stabilization, to meet an image stabilization requirement in a scenario of a large range of motion (for example, fast walking, running, or riding). Specifically, a tilt direction of the lens 31 during image stabilization is opposite to a shake direction of the electronic device. For example, FIG. 4A is a schematic diagram of a structure of an electronic device used when the electronic device shakes to the upper left according to some embodiments of this application. When the electronic device shakes from an initial location (a) to the upper left to a location (b), the lens of the camera module 30 tilts to the lower right, to implement compensation. FIG. 4B is a schematic diagram of a structure of an electronic device used when the electronic device shakes to the upper right according to some embodiments of this application. When the electronic device shakes from an initial location (a) to the upper right to a location (c), the lens of the camera module 30 tilts to the lower left, to implement compensation. FIG. 4C is a schematic diagram of a structure of an electronic device used when the electronic device shakes to the lower right according to some embodiments of this application. When the electronic device shakes from an initial location (a) to the lower right to a location (d), the lens of the camera module 30 tilts to the upper left, to implement compensation. FIG. 4D is a schematic diagram of a structure of an electronic device used when the electronic device shakes to the lower left according to some embodiments of this application. When the electronic device shakes from an initial location (a) to the lower left to a location (e), the lens of the camera module 30 tilts to the upper right, to implement compensation.

In the conventional technology, the camera module 30 usually achieves an objective of image stabilization by driving only the lens 31 to perform a tilting movement. However, an excessively large image stabilization angle cannot be designed, to avoid an excessively large tilt angle of the lens 31 relative to the image sensor 324, which affects clarity of a shot image. Therefore, a current electronic device still cannot meet an image stabilization requirement of a user when the user handholds the electronic device and performs a large range of motion.

Figure 5:
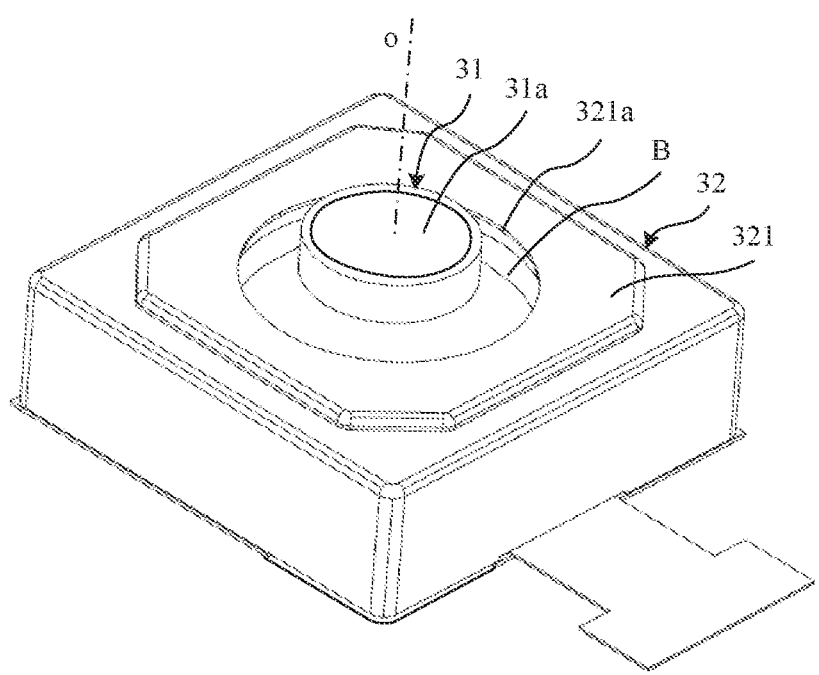
FIG. 5 is a three-dimensional diagram of a camera module according to some embodiments of this application.
Figure 6:
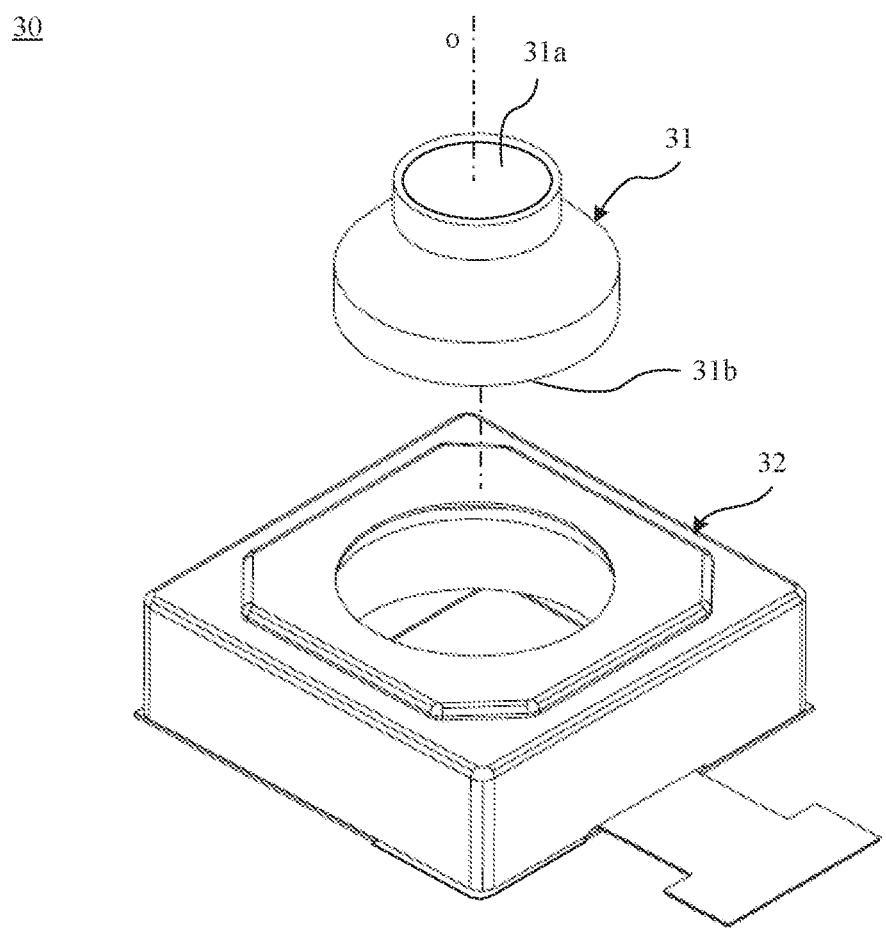
FIG. 6 is an exploded view of the camera module shown in FIG. 5.

To resolve the foregoing problem, in the image stabilization process, the lens may be controlled and driven to perform a tilting movement along with the image sensor, so that the lens can be prevented from tilting relative to the image sensor. In this way, an image stabilization angle does not affect image clarity, and therefore, large-angle image stabilization can be implemented. According to this design idea, FIG. 5 is a three-dimensional diagram of a camera module 30 according to some embodiments of this application, and FIG. 6 is an exploded view of the camera module 30 shown in FIG. 5. In this embodiment, the camera module 30 includes the lens 31 and a pan-tilt-zoom module 32.

The lens 31 is a vertical lens, that is, an optical axis o of the lens 31 extends along a straight line. Generally, the lens 31 includes a lens tube and an optical lens group mounted in the lens tube. The optical lens group is configured to: transmit light of a scene, and image a photographed scene. Lenses having different features such as a wide angle and a long focus may be obtained by designing a structure of the optical lens group and a shape and size of an optical lens, and camera modules having different features such as a wide angle and a long focus may be assembled by replacing different lenses on the pan-tilt-zoom module 32.

It may be understood that the lens 31 may alternatively include only an optical lens group. A plurality of optical lenses in the optical lens group are separately mounted in the pan-tilt-zoom module 32, and locations of the plurality of optical lenses relative to each other are fastened by using the pan-tilt-zoom module 32. In this way, the lens 31 and the pan-tilt-zoom module 32 are integrated as a whole, and the lens 31 and the pan-tilt-zoom module 32 cannot be detached from each other. This helps reduce a size of the camera module 30.

The lens 31 includes a light inlet end 31a and a light outlet end 31b. The light inlet end 31a of the lens 31 is an end that is of the lens 31 and that faces the photographed scene when the lens 31 is used, and the light of a scene is emitted into the lens 31 from the light inlet end 31a. The light outlet end 31b of the lens 31 is an end that is of the lens 31 and that is opposite to the photographed scene when the lens 31 is used, and the light of a scene is emitted out of the light outlet end 31b from the lens 31.

The pan-tilt-zoom module 32 is configured to: support the lens 31, and drive the lens 31 and an image sensor to tilt in any direction around, so as to implement image stabilization compensation of the camera module 30 when the electronic device shakes in any direction. The image sensor is included in the pan-tilt-zoom module 32.

Figure 7:
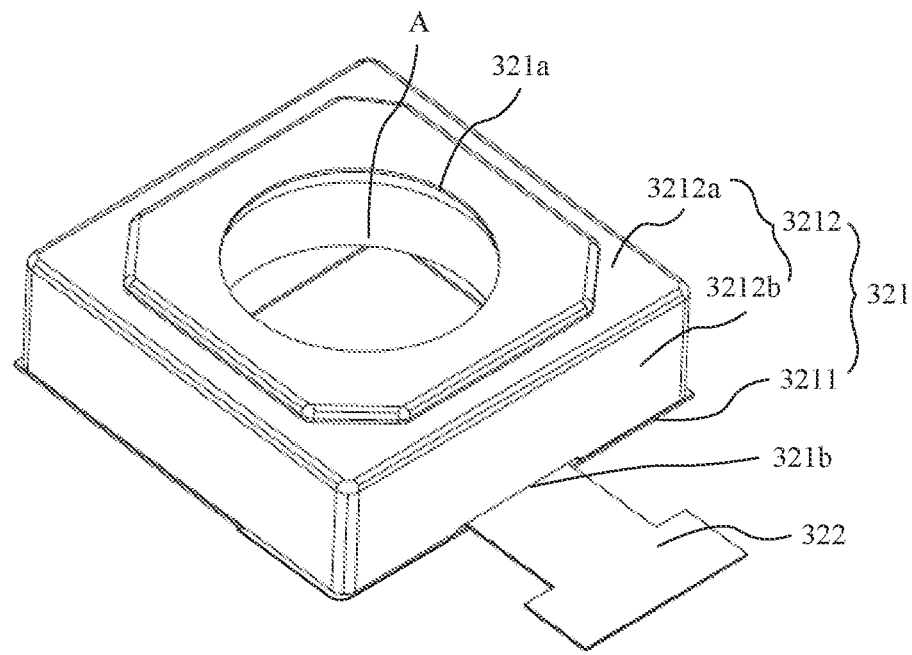
FIG. 7 is a three-dimensional diagram of a pan-tilt-zoom module in the camera module shown in FIG. 5 and FIG. 6.

FIG. 7 is a three-dimensional diagram of the pan-tilt-zoom module 32 in the camera module 30 shown in FIG. 5 and FIG. 6. In this embodiment, the pan-tilt-zoom module 32 includes a housing 321. The housing 321 is configured to protect an internal component and an internal circuit of the pan-tilt-zoom module 32 from water and dust. When the electronic device is formed through assembly, the pan-tilt-zoom module 32 is fastened in the electronic device by using the housing 321.

The housing 321 may be an integrated housing, or may be formed by assembling a plurality of parts. In some embodiments, the housing 321 includes a bottom plate 3211 and a cover body 3212. In some embodiments, the bottom plate 3211 is an integrated structure. The cover body 3212 includes a top plate 3212a and a side plate 3212b, and the side plate 3212b is peripherally disposed around edges of the top plate 3212a. In some embodiments, the cover body 3212 and the top plate 3212a are integrally formed. An edge that is of the side plate 3212b and that is away from the top plate 3212a is fastened to the bottom plate 3211. Specifically, the edge that is of the side plate 3212b and that is away from the top plate 3212a may be detachably fastened to the bottom plate 3211 by clamping, threading, or the like, or may be nondetachably fastened to the bottom plate 3211 by welding, riveting, or the like. This is not specifically limited herein. The housing 321 of this structure is formed by assembling two structures of the bottom plate 3211 and the cover body 3212, and can give consideration to both forming difficulty and assembling difficulty of the housing 321.

In the foregoing embodiment, forming materials of the bottom plate 3211 and the cover body 3212 include but are not limited to plastic and metal. In some embodiments, both the bottom plate 3211 and the cover body 3212 are made of metal, for example, an aluminum alloy, a magnesium aluminum alloy, a titanium alloy, or stainless steel. The metal has high hardness, which helps reduce a wall thickness of the housing 321 and reduce a size of the camera module 30.

An accommodating cavity A is disposed in the housing 321, and a first opening 321a in communication with the accommodating cavity A is provided on the housing 321. A shape of the first opening 321a includes but is not limited to a circle, a square, an oval, and a polygon. In some embodiments, still refer to FIG. 7. The first opening 321a is provided on the top plate 3212a. The first opening 321a is configured to accommodate the light inlet end 31a of the lens 31 when the lens 31 is mounted in the pan-tilt-zoom module 32 (refer back to FIG. 5). When the lens 31 is mounted in the pan-tilt-zoom module 32, still refer to FIG. 5. A specific avoidance gap B is maintained between a periphery of the housing edge at the first opening 321a and the light inlet end 31a of the lens 31, to perform avoidance on the lens 31 when the lens 31 tilts in any direction around.

Figure 8:
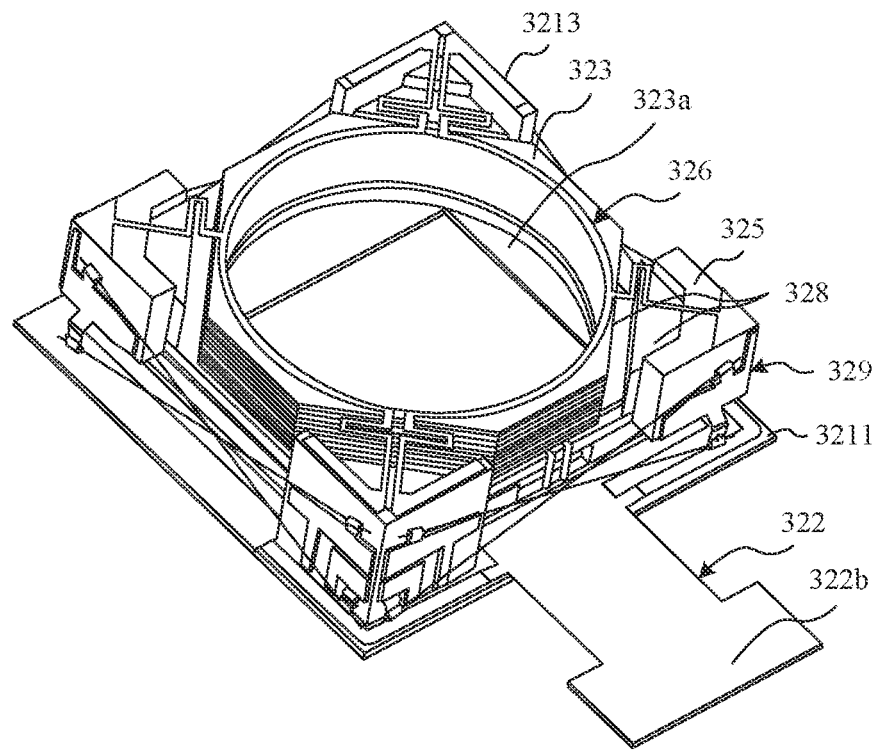
FIG. 8 is a three-dimensional diagram of the pan-tilt-zoom module shown in FIG. 7 after a cover body is removed.
Figure 9:
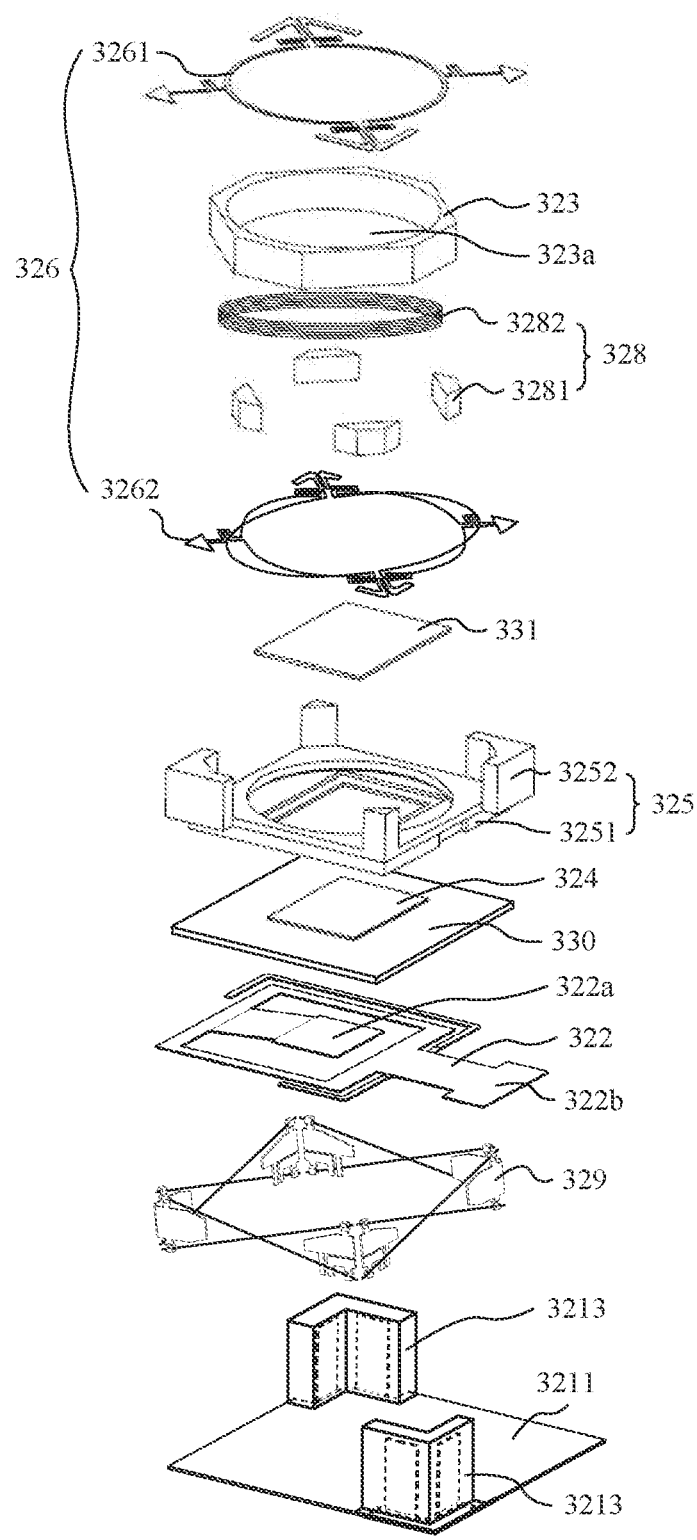
FIG. 9 is an exploded view of the pan-tilt-zoom module shown in FIG. 8.

FIG. 8 is a three-dimensional diagram of the pan-tilt-zoom module 32 shown in FIG. 7 after the cover body 3212 is removed. FIG. 9 is an exploded view of the pan-tilt-zoom module 32 shown in FIG. 8. The pan-tilt-zoom module 32 further includes a carrier 323 located in the accommodating cavity A shown in FIG. 7, a circuit board 330, an image sensor 324, an image stabilization component 329, and a flexible electrical connection structure 322.

The carrier 323 has a lens mounting hole 323a, the lens mounting hole 323a is opened at both ends in an axial direction, an opening at one end of the lens mounting hole 323a faces the first opening 321a shown in FIG. 7, and the lens mounting hole 323a is configured to mount the lens 31 in FIG. 6. In some embodiments, the lens 31 in FIG. 6 is detachably mounted in the lens mounting hole 323a by clamping, threading, or the like, to facilitate replacement of the lens 31. In addition, when the lens 31 is mounted in the lens mounting hole 323a, an extension direction of the optical axis o of the lens 31 is consistent with an axial direction of the lens mounting hole 323a. A forming material of the carrier 323 includes but is not limited to metal and plastic. In some embodiments, the forming material of the carrier 323 is plastic.

The circuit board 330 is located on a side that is of the carrier 323 and that is away from the first opening 321a shown in FIG. 7, and the circuit board 330 is configured to provide a support circuit for the image sensor 324. The image sensor 324 is disposed on a surface that is of the circuit board 330 and that faces the carrier 323, and a photosensitive surface of the image sensor 324 faces an opening at the other end of the lens mounting hole 323a. When the lens 31 in FIG. 6 is mounted in the lens mounting hole 323a, an end face of the light outlet end 31b of the lens 31 is opposite to the photosensitive surface of the image sensor 324, and light emitted from the light outlet end 31b of the lens 31 is emitted into the image sensor 324 by using the photosensitive surface. The image sensor 324 can convert image light into an electrical signal including image information. The electrical signal including image information is transmitted to a calculation control unit, so that the calculation control unit performs subsequent image processing.

In some embodiments, the circuit board 330 is fastened relative to the carrier 323. In this way, a location of the carrier 323 relative to the circuit board 330 is fixed, and a location of the lens 31 in FIG. 6 relative to the image sensor 324 on the circuit board 330 is fixed, so that a fixed-focus camera module is formed.

In some other embodiments, still refer to FIG. 8 and FIG. 9. The pan-tilt-zoom module 32 further includes a base body 325 and a focus adjustment component 328. The base body 325 is located on the side that is of the carrier 323 and that is away from the first opening 321a shown in FIG. 7, and the circuit board 330 is fastened to the base body 325. The focus adjustment component 328 is connected between the carrier 323 and the base body 325. The focus adjustment component 328 is configured to drive the carrier 323 to move relative to the base body 325 in the axial direction of the lens mounting hole 323a, to drive the lens in the lens mounting hole 323a to move in an extension direction of an optical axis of the lens, so that an auto-focus camera module is formed.

In the foregoing embodiment, the base body 325 is configured to: fasten and support the circuit board 330 and the focus adjustment component 328. The base body 325 may be an integrated structure, or may be formed by assembling a plurality of parts. This is not specifically limited herein. In some embodiments, refer to FIG. 9. The base body 325 includes a first base body unit 3251 and a second base body unit 3252. The first base body unit 3251 and the second base body unit 3252 are fastened by bonding, clamping, threading, or the like. The first base body unit 3251 is configured to: fasten and support the circuit board 330, the second base body unit 3252 is located on a side that is of the first base body unit 3251 and that is close to the carrier 323, and the second base body unit 3252 is configured to: fasten and support the focus adjustment component 328.

Figure 10:
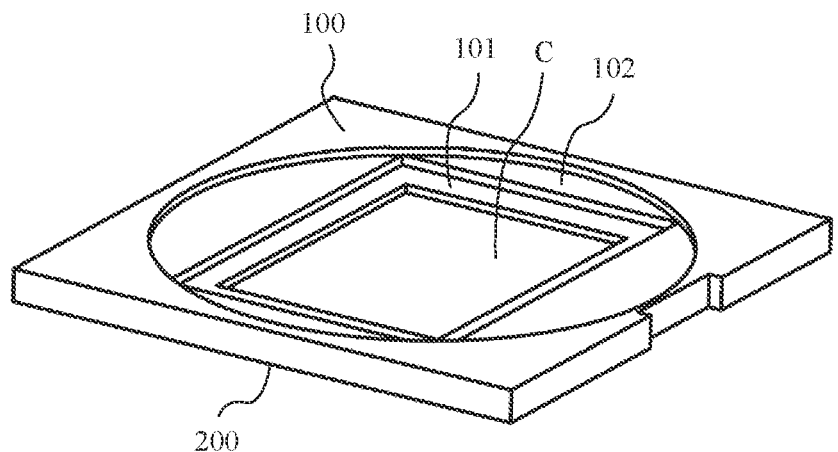
FIG. 10 is a schematic diagram of a structure of a first base body unit in a base body of the pan-tilt-zoom module shown in FIG. 9.
Figure 11:
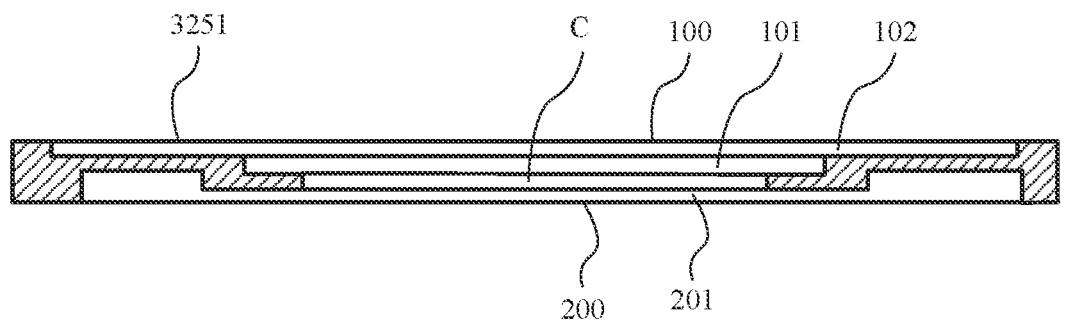
FIG. 11 is a schematic diagram of a cross-section structure of the first base body unit shown in FIG. 10.
Figure 12:
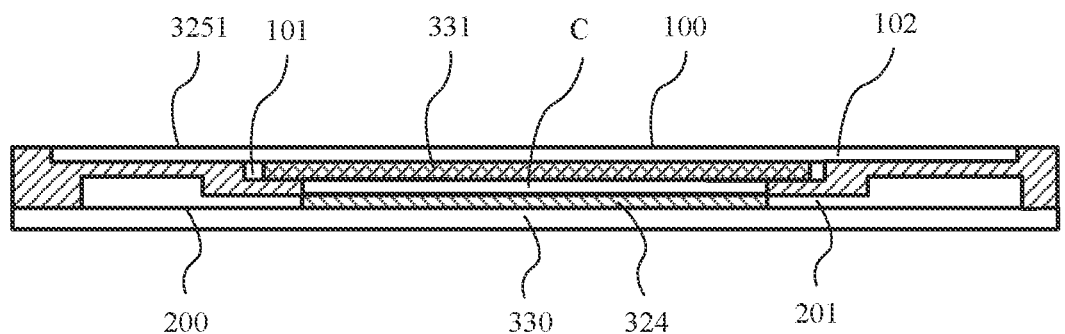
FIG. 12 is a schematic diagram of an assembly structure of a first base body unit and an image sensor in the pan-tilt-zoom module shown in FIG. 9.

FIG. 10 is a schematic diagram of a structure of the first base body unit 3251 in the base body 325 of the pan-tiltzoom module 32 shown in FIG. 9. The first base body unit 3251 is a plate-shaped structure. The first base body unit 3251 includes a first surface 100 and a second surface 200 that are opposite to each other, the first surface 100 is configured to: attach and fasten the second base body unit 3252, and the first base body unit 3251 is provided with a through hole C that penetrates the first surface 100 and the second surface 200. FIG. 11 is a schematic diagram of a cross-section structure of the first base body unit 3251 shown in FIG. 10. A first mounting groove 201 is provided at a location that is on a second surface 200 of the first base body unit 3251 and that corresponds to the through hole C. FIG. 12 is a schematic diagram of an assembly structure of the first base body unit 3251 and the image sensor 324 in the pan-tilt-zoom module 32 shown in FIG. 9. The circuit board 330 is fastened to the second surface 200 of the first base body unit 3251 by threading, bonding, clamping, or the like. The image sensor 324 is accommodated in the first mounting groove 201, and the photosensitive surface of the image sensor 324 is opposite to the through hole C. The through hole C is configured to perform avoidance on incident light of the image sensor 324. A forming material of the first base body unit 3251 includes but is not limited to metal and plastic. In some embodiments, the forming material of the first base body unit 3251 is plastic.

Still refer to FIG. 10 and FIG. 11. A second mounting groove 101 is provided at a location that is on the first surface 100 of the first base body unit 3251 and that corresponds to the through hole C, and the second mounting groove 101 is configured to mount an optical filter that filters the incident light of the image sensor 324. Still refer to FIG. 12. An optical filter 331 is mounted in the second mounting groove 101. The optical filter 331 includes but is not limited to an infrared filter, a haze penetration filter, and the like. This is not specifically limited herein. In some embodiments, the optical filter 331 is an infrared filter.

Still refer to FIG. 10 to FIG. 12. An avoidance groove 102 is further provided on the first surface 100 of the first base body unit 3251. The avoidance groove 102 is configured to perform avoidance on the light outlet end 31*b* of the lens 31 in FIG. 6 in an auto focus process.

Figure 13:
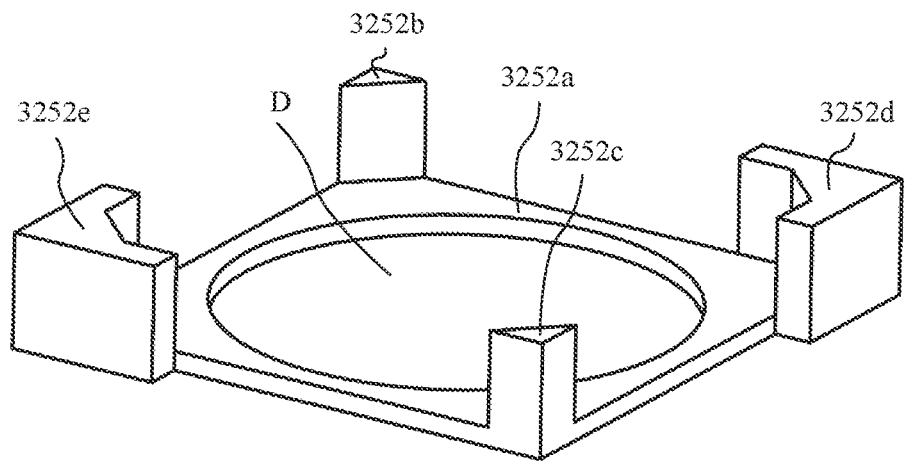
FIG. 13 is a schematic diagram of a structure of a second base body unit in a base body of the pan-tilt-zoom module shown in FIG. 9.

FIG. 13 is a schematic diagram of a structure of the second base body unit 3252 in the base body 325 of the pan-tilt-zoom module 32 shown in FIG. 9. The second base body unit 3252 includes a substrate portion 3252*a* and a stop post. The substrate portion 3252*a* and the first base body unit 3251 shown in FIG. 10 are disposed in a stacked manner, an avoidance hole D is provided in a middle part of the substrate portion 3252*a*, and the avoidance hole D is configured to perform avoidance on the lens 31 in FIG. 6. The stop post is disposed at an edge that is of the substrate portion 3252*a* and that faces the surface of the carrier 323 shown in FIG. 9, and an included angle region between the stop post and the substrate portion 3252*a* is used to fasten the focus adjustment component 328. In some embodiments, the stop post includes a first stop post 3252*b*, a second stop post 3252*c*, a third stop post 3252*d*, and a fourth stop post 3252*e*. The first stop post 3252*b*, the second stop post 3252*c*, the third stop post 3252*d*, and the fourth stop post 3252*e* are evenly and peripherally arranged around an edge of the substrate portion 3252*a*. Forming materials of the stop post and the substrate portion 3252*a* include but are not limited to metal and plastic. In some embodiments, the stop post and the substrate portion 3252*a* are made of plastic, and the stop post and the substrate portion 3252*a* are integrally formed.

Figure 14:
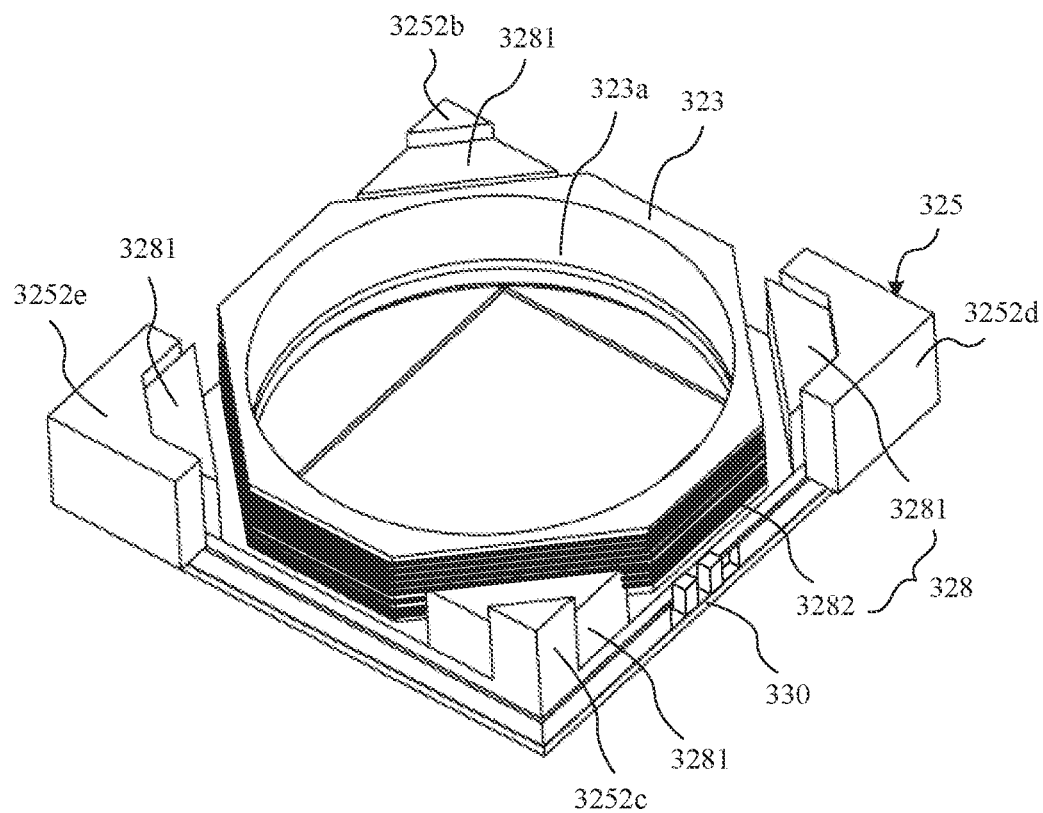
FIG. 14 is a schematic diagram of an assembly structure of a carrier, a base body, and a focus adjustment component in the pan-tilt-zoom module shown in FIG. 9.

There are a plurality of structural forms of the focus adjustment component 328. This is not specifically limited herein. In some embodiments, FIG. 14 is a schematic diagram of an assembly structure of the carrier 323, the base body 325, and the focus adjustment component 328 in the pan-tilt-zoom module 32 shown in FIG. 9. In this embodiment, a structure and an action principle of the focus adjustment component 328 are the same as a structure and an action principle of a voice coil motor. Specifically, the focus adjustment component 328 includes a magnet 3281 and a coil 3282. One of the magnet 3281 and the coil 3282 is fastened to the carrier 323, and the other of the magnet 3281 and the coil 3282 is fastened to the base body 325. In some embodiments, still refer to FIG. 14. The magnet 3281 is fastened to the base body 325, and the coil 3282 is fastened to the carrier 323. Under an action of a magnetic field of the magnet 3281, the energized coil 3282 can generate ampere force in the axial direction of the lens mounting hole 323*a*, to drive the carrier 323 to move relative to the base body 325 in the axial direction of the lens mounting hole 323*a*. It may be understood that the magnet 3281 may alternatively be fastened to the carrier 323. In this case, the coil 3282 is fastened to the base body 325.

In some embodiments, still refer to FIG. 14. There are four magnets 3281, and the four magnets 3281 are respectively fastened in included angle regions between the first stop post 3252*b* and the substrate portion 3252*a*, between the second stop post 3252*c* and the substrate portion 3252*a*, between the third stop post 3252*d* and the substrate portion 3252*a*, and between the fourth stop post 3252*e* and the substrate portion 3252*a*. The coil 3282 is disposed around the carrier 323 along a circumference of the carrier 323.

It may be understood that there may alternatively be two magnets 3281, and the two magnets 3281 are respectively disposed on two opposite sides of the carrier 323. There are also two coils 3282, and the two coils 3282 are respectively disposed on two side walls that are of the carrier 323 and that face the two magnets 3281.

In some embodiments, still refer to FIG. 9. The pan-tilt-zoom module 32 further includes a first elastic structure 326 to reset the carrier 323 to an initial location after one auto focus operation, so as not to affect a next focus operation. The first elastic structure 326 is connected between the carrier 323 and the base body 325, and the first elastic structure 326 is configured to elastically support the carrier 323 on the base body 325. It should be noted that, that the first elastic structure 326 is connected between the carrier 323 and the base body 325 is not limited to a case in which the first elastic structure 326 is directly connected between the carrier 323 and the base body 325, and further includes an indirect connection case in which the first elastic structure 326 is connected between another structure fastened to the carrier 323 and the base body 325, or the first elastic structure 326 is connected between the carrier 323 and another structure fastened to the base body 325, or the first elastic structure 326 is connected between another structure fastened to the carrier 323 and another structure fastened to the base body 325. This is not specifically limited herein. FIG. 8 and FIG. 9 merely show an example in which the first elastic structure 326 is directly connected between the carrier 323 and the base body 325. This cannot be considered as a special limitation on this application.

In some embodiments, refer to FIG. 9. The first elastic structure 326 includes a first elastic part 3261 and a second elastic part 3262. The first elastic part 3261 and the second elastic part 3262 include but are not limited to a spring plate and a coil spring. In this application, only an example in which the first elastic part 3261 and the second elastic part 3262 are spring plates is used for description. This cannot be considered as a special limitation on this application.

Figure 15:
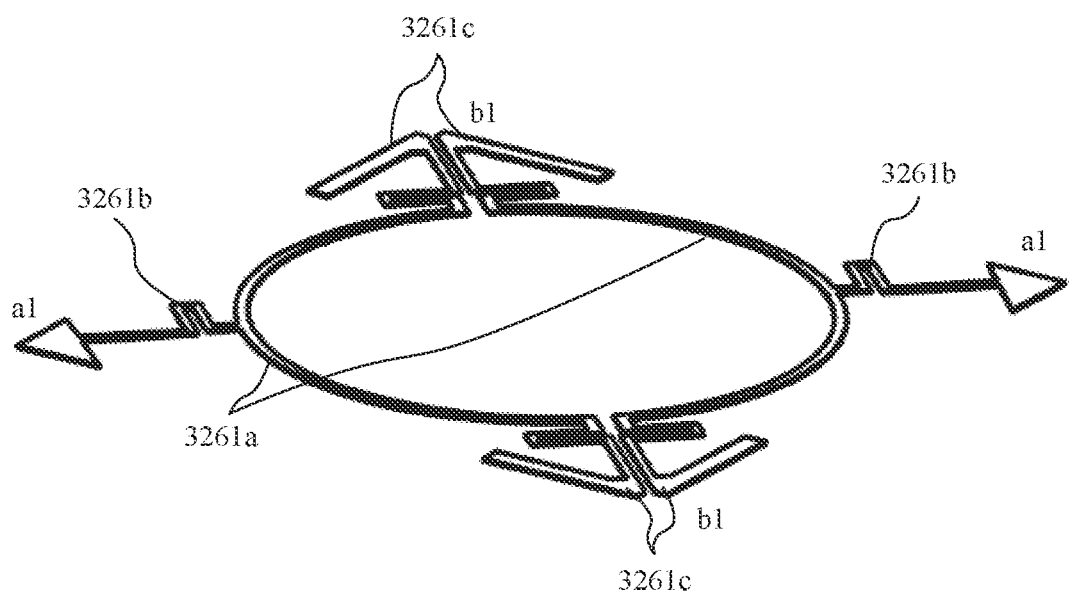
FIG. 15 is a schematic diagram of a structure of a first elastic part in the pan-tilt-zoom module shown in FIG. 9.
Figure 16:
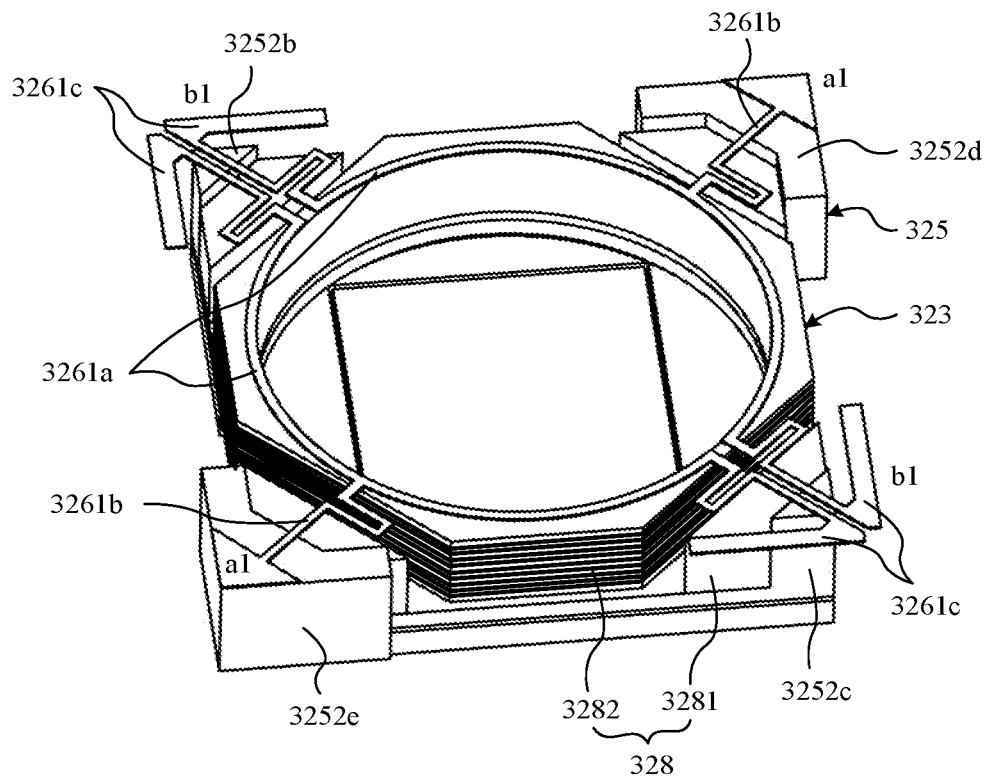
FIG. 16 is a schematic diagram of an assembly structure of the first elastic part shown in FIG. 15 and the carrier, the base body, and the focus adjustment component in FIG. 14.

The first elastic part 3261 is connected between the base body 325 and an end that is of the carrier 323 and that is close to the first opening 321a shown in FIG. 7. In some embodiments, FIG. 15 is a schematic diagram of a structure of the first elastic part 3261 in the pan-tilt-zoom module 32 shown in FIG. 9, and FIG. 16 is a schematic diagram of an assembly structure of the first elastic part 3261 shown in FIG. 15 and the carrier 323, the base body 325, and the focus adjustment component 328 in FIG. 14. In this embodiment, the first elastic part 3261 includes a first fastening portion 3261a and at least two first elastic arm portions 3261b. The first fastening portion 3261a is fastened to the end that is of the carrier 323 and that is close to the first opening 321a shown in FIG. 7. The first fastening portion 3261a may be an integrated mechanical part, or may be formed by a plurality of parts. This is not specifically limited herein. In some embodiments, refer to FIG. 15 and FIG. 16. The first fastening portion 3261a is an annular structure formed by combining two semi-circular rings spaced from each other. The at least two first elastic arm portions 3261b are evenly arranged along a circumference of the carrier 323, one end of each of the at least two first elastic arm portions 3261b is connected to the first fastening portion 3261a, and the other end a1 of each of the at least two first elastic arm portions 3261b is fastened relative to the base body 325. In some embodiments, there are two first elastic arm portions 3261b, one end of each of the two first elastic arm portions 3261b is separately fastened to the two semi-circular rings of the first fastening portion 3261a, and the other end a1 of each of the two first elastic arm portions 3261b is separately fastened to the third stop post 3252d and the fourth stop post 3252e of the base body 325.

Figure 17A:
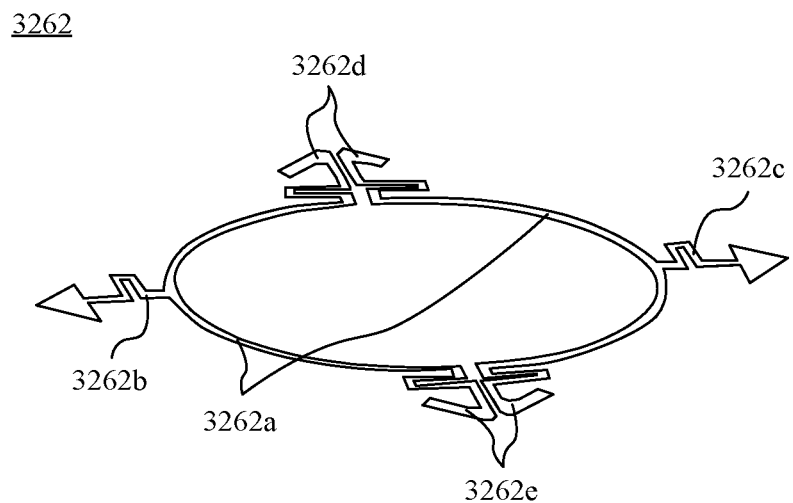
FIG. 17A is a schematic diagram of a structure of a second elastic part in the pan-tilt-zoom module shown in FIG. 9.
Figure 17B:
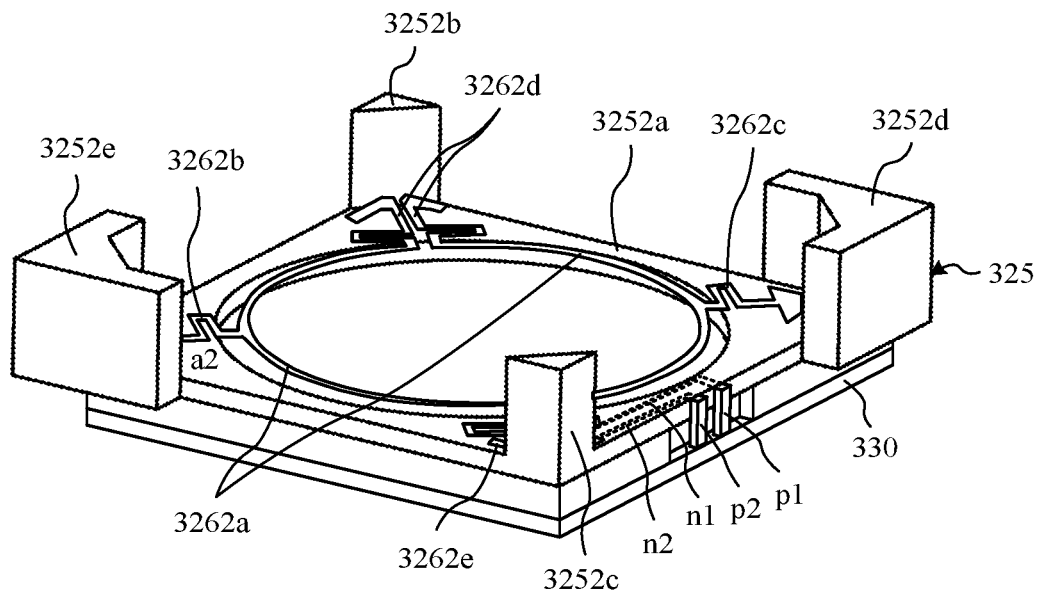
FIG. 17B is a schematic diagram of an assembly structure of the second elastic part shown in FIG. 17A and a base body in the pan-tilt-zoom module shown in FIG. 9.

The second elastic part 3262 is connected between the base body 325 and an end that is of the carrier 323 and that is away from the first opening 321a shown in FIG. 7. In some embodiments, FIG. 17A is a schematic diagram of a structure of the second elastic part 3262 in the pan-tilt-zoom module 32 shown in FIG. 9, and FIG. 17B is a schematic diagram of an assembly structure of the second elastic part 3262 shown in FIG. 17A and the base body 325 in the pan-tilt-zoom module 32 shown in FIG. 9. In this embodiment, the second elastic part 3262 includes a second fastening portion 3262a and at least two third elastic arm portions. The second fastening portion 3262a is fastened to the end that is of the carrier 323 and that is away from the first opening 321a. The second fastening portion 3262a may be an integrated mechanical part, or may be formed by a plurality of parts. This is not specifically limited herein. In some embodiments, refer to FIG. 17A and FIG. 17B. The second fastening portion 3262a is an annular structure formed by combining two semi-circular rings spaced from each other. The at least two third elastic arm portions are evenly arranged along the circumference of the carrier 323, one end of each of the at least two third elastic arm portions is connected to the second fastening portion 3262a, and the other end of each of the at least two third elastic arm portions is fastened relative to the base body 325. In some embodiments, refer to FIG. 17A and FIG. 17B. There are four third elastic arm portions, and the four third elastic arm portions are respectively an elastic arm portion 3262b, an elastic arm portion 3262c, an elastic arm portion 3262d, and an elastic arm portion 3262e. One end of each of the elastic arm portion 3262b, the elastic arm portion 3262c, the elastic arm portion 3262d, and the elastic arm portion 3262e is fastened to the second fastening portion 3262a, and the other end of each of the elastic arm portion 3262b, the elastic arm portion 3262c, the elastic arm portion 3262d, and the elastic arm portion 3262e is separately fastened to locations that are of the bottom plate portion 3252a and that are close to the fourth stop post 3252e, the third stop post 3252d, the first stop post 3252b, and the second stop post 3252c.

When the carrier 323 moves relative to the base body 325 in the axial direction of the lens mounting hole 323a to implement auto focus, the first elastic arm portion 3261b and the third elastic arm portion (including the elastic arm portion 3262b, the elastic arm portion 3262c, the elastic arm portion 3262d, and the elastic arm portion 3262e) are bent and deformed and accumulate elastic force. When auto focus driving force applied to the carrier 323 is removed, the elastic force may drive the carrier 323 to reset, so that a next focus operation is not affected. When the base body 325 tilts in any direction around to implement image stabilization compensation, the first elastic arm portion 3261b and the third elastic arm portion can connect the carrier 323 and the base body 325 to form a complete part, to drive the carrier 323 to tilt along with the base body 325, thereby implementing simultaneous image stabilization driving of the lens and the image sensor.

In this embodiment, the first elastic structure 326 including the first elastic part 3261 and the second elastic part 3262 elastically supports the end that is of the carrier 323 and that is close to the first opening 321a and the end that is of the carrier 323 and that is away from the first opening 321a on the base body 325 separately, so that when the base body 325 tilts in any direction around, the carrier 323 can be prevented from tilting relative to the base body 325 under an action of a self-weight and load bearing, thereby improving support stability of the carrier 323 on the base body 325.

Figure 18:
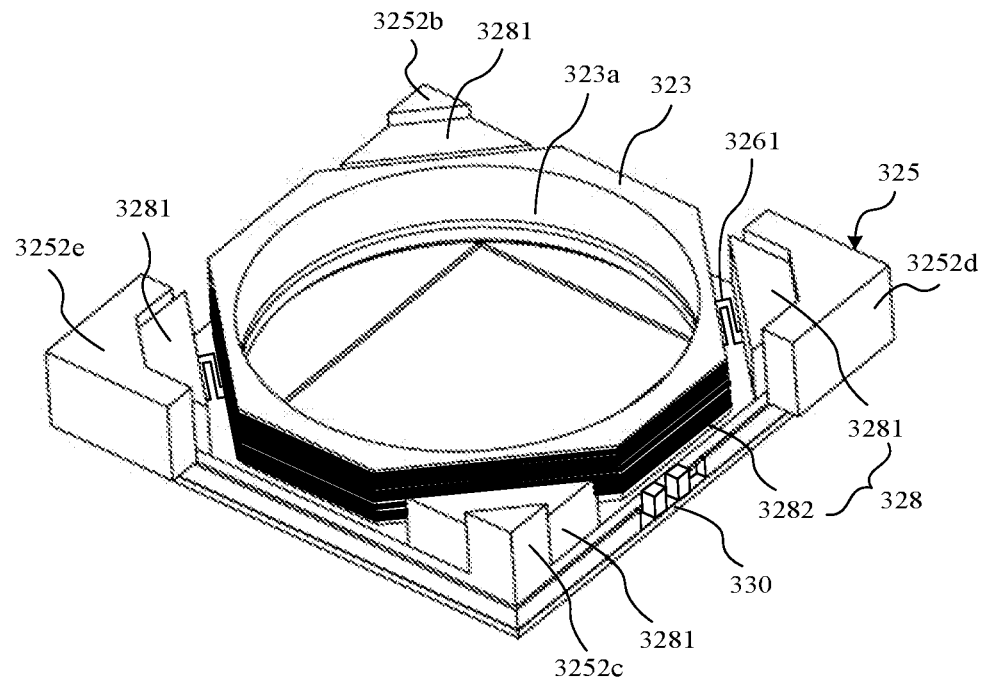
FIG. 18 is a schematic diagram of an assembly structure of the second elastic part shown in FIG. 17A and the carrier, the base body, and the focus adjustment component in FIG. 14.

In the foregoing embodiment, still refer to FIG. 17A and FIG. 17B. The elastic arm portion 3262d includes two elastic arm units spaced from each other. One end of each of the two elastic arm units is separately fastened to two semi-circular rings of the second fastening portion 3262a, and the other end of each of the two elastic arm units is fastened to a location that is of the substrate portion 3252a and that is close to the first stop post 3252b. The elastic arm portion 3262e also includes two elastic arm units spaced from each other. One end of each of the two elastic arm units is separately fastened to the two semi-circular rings of the second fastening portion 3262a, and the other end of each of the two elastic arm units is fastened to a location that is of the substrate portion 3252a and that is close to the second stop post 3252c. In this way, the second elastic part 3262 includes two elastic part units spaced from each other. The two elastic part units not only can accumulate elastic force when the carrier 323 moves in the axial direction of the lens mounting hole 323a, but also are configured to connect positive and negative electrodes of the coil 3282 in FIG. 14, so as to transmit a drive signal to the coil 3282. Specifically, refer to FIG. 17B. The circuit board 330 is electrically connected to the substrate portion 3252a by using a terminal p1 and a terminal p2, so as to introduce an auto focus drive signal from the circuit board 330 to the substrate portion 3252a. A conductive part n1 and a conductive part n2 are embedded in the substrate portion 3252a. One end of the electric-conductor n1 is electrically connected to the terminal p1, and the other end of the electric-conductor n1 is electrically connected to one elastic part unit forming the second elastic part 3262. One end of the electric-conductor n2 is electrically connected to the terminal p2, and the other end of the electric-conductor n2 is electrically connected to the other elastic part unit forming the second elastic part 3262. Further, FIG. 18 is a schematic diagram of an assembly structure of the second elastic part 3262 shown in FIG. 17A and the carrier 323, the base body 325, and the focus adjustment component 328 in FIG. 14. The end that is of the carrier 323 and that is away from the first opening 321a shown in FIG. 7 is fastened to two semi-circular rings forming the second fastening portion 3262a in FIG. 17A. Therefore, the two elastic part units forming the second elastic part 3262 may further introduce the auto focus drive signal to the carrier 323. Still refer to FIG. 18. Two conductive parts (not shown in the figure) are embedded in the carrier 323. One end of each of the two electric-conductors is electrically connected to the two semi-circular rings forming the second fastening portion 3262a, and the other end of each of the two electric-conductors is electrically connected to the positive electrode and the negative electrode of the coil 3282. In this way, the auto focus drive signal is transmitted from the circuit board 330 to the coil 3282 in the focus adjustment component 328 by using the second elastic part 3262.

Still refer to FIG. 18. The four magnets 3281 are respectively disposed on locations that are of the elastic arm portion 3262b, the elastic arm portion 3262c, the elastic arm portion 3262d, and the elastic arm portion 3262e and that are fastened to the substrate portion 3252a, and are insulated from the elastic arm portion 3262b, the elastic arm portion 3262c, the elastic arm portion 3262d, and the elastic arm portion 3262e.

In some embodiments, the pan-tilt-zoom module 32 further includes a second elastic structure. The second elastic structure is connected between the base body 325 and the housing 321 in FIG. 7. The second elastic structure is configured to elastically support the base body 325 in the housing 321, so that an entirety forming by the carrier 323, the base body 325, the focus adjustment component 328, the image sensor 324, the circuit board 330, and the first elastic structure 326 may be suspended in the housing 321. In this way, the image stabilization component 329 may drive the entirety to tilt in any direction around, so as to implement image stabilization compensation.

It should be noted that, that the second elastic structure is connected between the base body 325 and the housing 321 in FIG. 7 is not limited to a case in which the second elastic structure is directly connected between the base body 325 and the housing 321, and further includes an indirect connection case in which the second elastic structure is connected between another structure fastened to the carrier 323 and the housing 321, or the second elastic structure is connected between the base body 325 and another structure fastened to the housing 321, or the second elastic structure is connected between another structure fastened to the base body 325 and another structure fastened to the housing 321. This is not specifically limited herein.

In addition, the second elastic structure and the first elastic structure 326 may be a same structure, or may be different structures. This is not specifically limited herein.

In some embodiments, refer back to FIG. 15 and FIG. 16. In addition to the first fastening portion 3261a and the at least two first elastic arm portions 3261b, the first elastic part 3261 includes at least two second elastic arm portions 3261c. The at least two second elastic arm portions 3261c are evenly arranged along the circumference of the carrier 323, one end of each of the at least two second elastic arm portions 3261c is connected to the first fastening portion 3261a, and the other end b1 of each of the at least two second elastic arm portions 3261c is fastened relative to the housing 321 in FIG. 7. In some embodiments, there are two second elastic arm portions 3261c.

Figure 19:
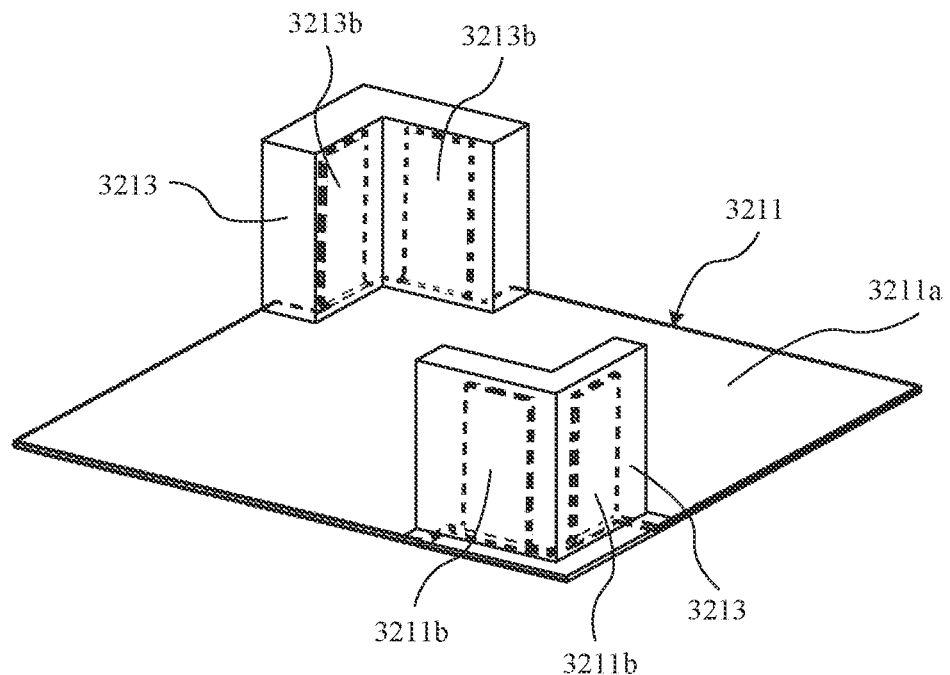
FIG. 19 is a schematic diagram of a structure of a bottom plate with a support post in the pan-tilt-zoom module shown in FIG. 9.
Figure 20:
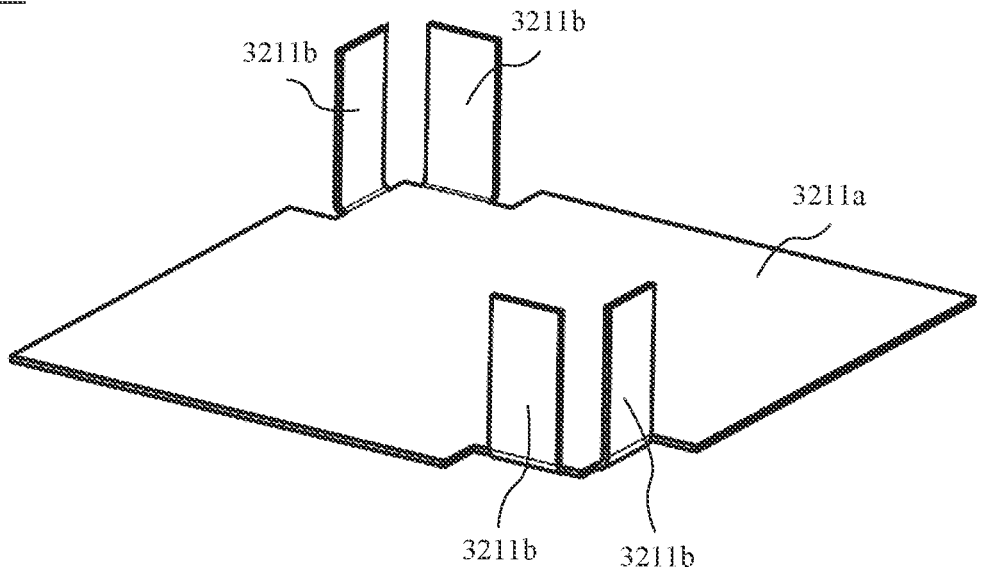
FIG. 20 is a schematic diagram of a structure of a bottom plate without a support post in the pan-tilt-zoom module shown in FIG. 9.

In some embodiments, FIG. 19 is a schematic diagram of a structure of a bottom plate 3211 with a support post in the pan-tilt-zoom module 32 shown in FIG. 9. The bottom plate 3211 is included in the housing 321 in FIG. 7, at least two support posts 3213 are fastened to the bottom plate 3211, and the at least two support posts 3213 are located in the accommodating cavity A in FIG. 7 and are evenly arranged along the circumference of the carrier 323 in FIG. 16. In the embodiment shown in FIG. 19, there are two support posts 3213. A forming material of the support post 3213 includes but is not limited to metal and plastic. In some embodiments, the forming material of the support post 3213 is plastic. Costs of the plastic are low, which helps reduce costs of the pan-tilt-zoom module. The support post 3213 may be fastened to the bottom plate 3211 by bonding, screwing, clamping, or the like. This is not specifically limited herein. Because the support post 3213 is erected on the bottom plate 3211, and a contact area between the support post 3213 and the bottom plate 3211 is small, the support post 3213 and the bottom plate 3211 cannot be securely connected by bonding, screwing, clamping, or the like. To solve the problem, the support post 3213 is formed on the bottom plate 3211. Specifically, the support post 3213 is formed on the bottom plate 3211 in an in-mold injection molding process. In view of this, to ensure connection stability between the support post 3213 and the bottom plate 3211, in some embodiments, refer to FIG. 20. FIG. 20 is a schematic diagram of a structure of a bottom plate 3211 without a support post in the pan-tilt-zoom module 32 shown in FIG. 9, and the bottom plate 3211 includes a bottom plate body 3211a and at least two fastening posts 3211b disposed on the bottom plate body 3211a. In some embodiments, the bottom plate body 3211a and the fastening post 3211b are integrally formed. The at least two fastening posts 3211b extend toward a direction close to the top plate 3212a in FIG. 7, and the two support posts 3213 are formed in the in-mold injection molding process and wrapped outside the fastening posts 3211b. In some embodiments, there are four fastening posts 3211b. One support post 3213 is formed and wrapped on two fastening posts 3211b, and the other support post 3213 is formed and wrapped on the other two fastening posts 3211b. In this way, a contact area between the bottom plate 3211 and the support post 3213 can be increased, and connection strength between the bottom plate 3211 and the support post 3213 can be improved.

Figure 21:
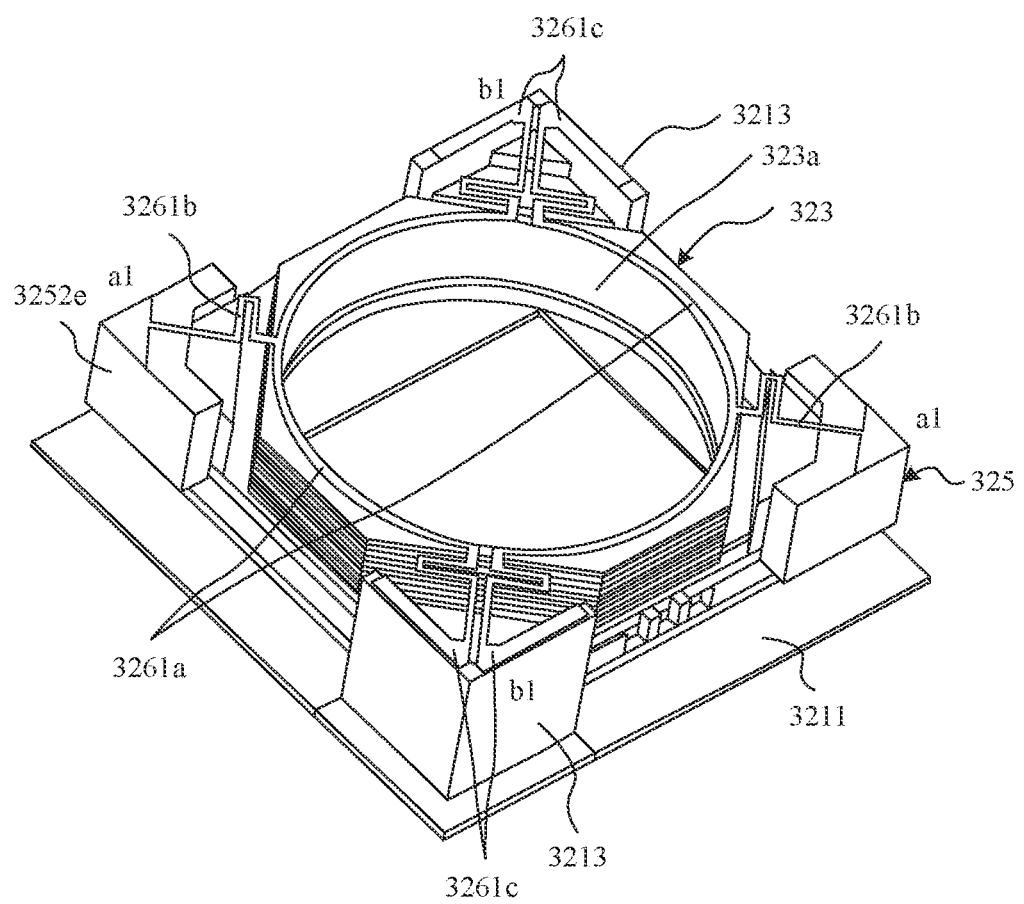
FIG. 21 is an assembly diagram of the carrier, the base body, the first elastic part, and the focus adjustment component shown in FIG. 16 and the bottom plate shown in FIG. 19.

FIG. 21 is an assembly diagram of the carrier 323, the base body 325, the first elastic part 3261, and the focus adjustment component 328 shown in FIG. 16, and the bottom plate 3211 shown in FIG. 19. The other end b1 of each of the two second elastic arm portions 3261c is separately fastened to the two support posts 3213, so as to indirectly fasten the two second elastic arm portions 3261c to the housing 321 in FIG. 7 by using the two support posts 3213.

When the carrier 323 moves relative to the base body 325 in the axial direction of the lens mounting hole 323a to implement auto focus, the two second elastic arm portions 3261c and the two first elastic arm portions 3261b are bent and deformed and accumulate elastic force. When the auto focus driving force applied to the carrier 323 is removed, the accumulated elastic force may drive the carrier 323 to reset, so that a next focus operation is not affected. To prevent the base body 325 from moving relative to the housing 321 in FIG. 7 in an auto focus process, the image stabilization component 329 may keep a location of the base body 325 relative to the housing 321 in FIG. 7 unchanged. Specifically, how the image stabilization component 329 keeps the location of the base body 325 relative to the housing 321 in FIG. 7 unchanged is described below.

When the base body 325 tilts in any direction around to implement image stabilization compensation, locations of the two first elastic arm portions 3261b relative to the carrier 323 and the base body 325 remain unchanged, and the two second elastic arm portions 3261c are twisted and accumulate elastic force. When the image stabilization driving force applied to the base body 325 is canceled, the accumulated elastic force may drive the base body 325 to reset, so that a next image stabilization compensation operation is not affected.

When the carrier 323 moves relative to the base body 325 in the axial direction of the lens mounting hole 323a to implement auto focus, and the base body 325 tilts in any direction around to implement image stabilization compensation, the first elastic arm portion 3261b is bent and deformed, and the second elastic arm portion 3261c is bent and twisted. There is specific cross impact between the auto focus motion and the image stabilization compensation motion. To ensure accuracy of auto focus and optical image stabilization, a loop closing detection apparatus may be configured to detect a moving distance of the carrier 323 and a tilt angle of the base body 325. Specifically, an existing structure may be used as a structure of the loop closing detection apparatus. Details are not described herein.

In this embodiment, the first elastic part 3261 is connected to the base body 325 by using the first elastic arm portion 3261b, and is connected to the two support posts 3213 of the bottom plate 3211 by using the second elastic arm portion 3261c, so that the base body 325 is elastically supported in the housing 321 in FIG. 7, and the first elastic part 3261 forms the second elastic structure. The second elastic structure and the first elastic part 3261 are integrated, so that a quantity of components of the pan-tilt-zoom module 32 can be reduced, structural complexity and assembling difficulty of the pan-tilt-zoom module 32 can be reduced, and assembling efficiency of the pan-tilt-zoom module 32 can be improved.

Figure 22:
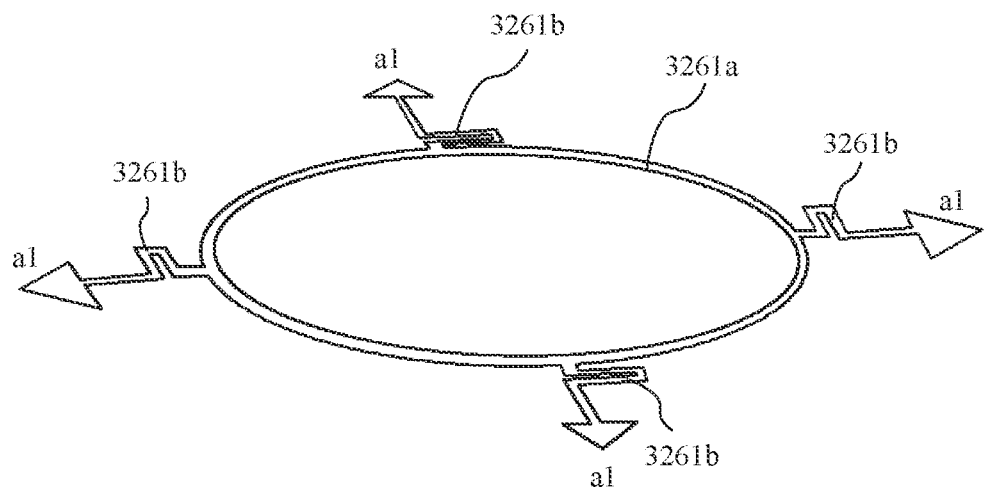
FIG. 22 is a schematic diagram of a structure of a first elastic part according to some other embodiments of this application.
Figure 23:
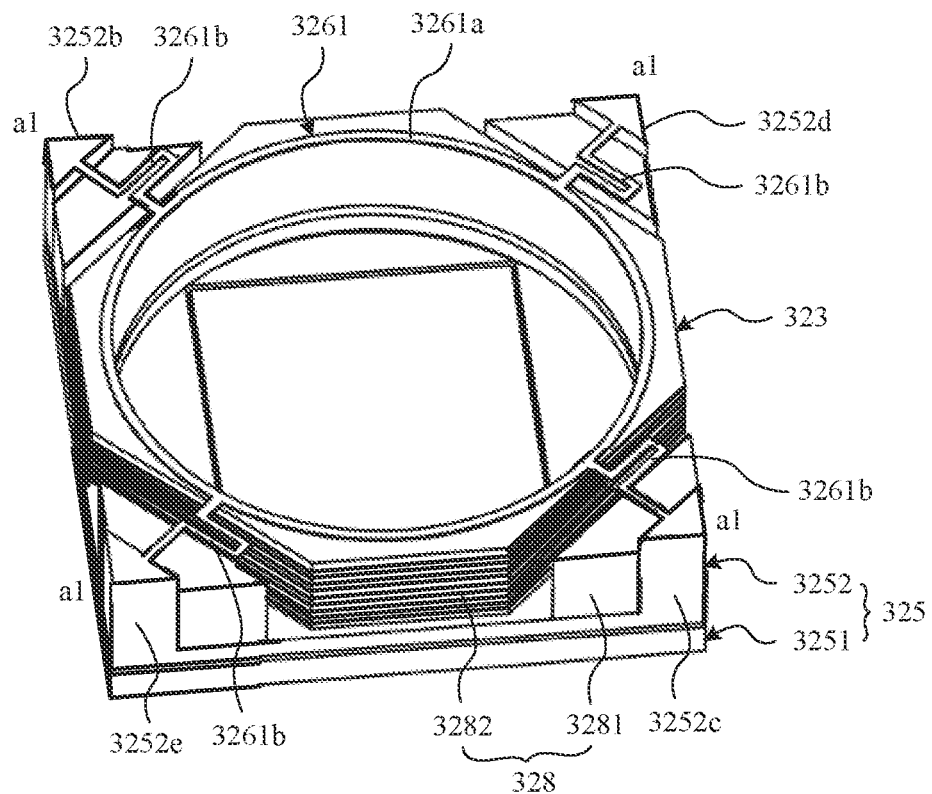
FIG. 23 is a schematic diagram of an assembly structure of the first elastic part shown in FIG. 22, and a carrier, a base body, a focus adjustment component, and a second elastic part.

In some other embodiments, FIG. 22 is a schematic diagram of a structure of the first elastic part 3261 according to some other embodiments of this application, and FIG. 23 is a schematic diagram of an assembly structure of the first elastic part 3261 shown in FIG. 22 and the carrier 323, the base body 325, the focus adjustment component 328, and the second elastic part 3262. In this embodiment, the first elastic part 3261 includes the first fastening portion 3261a and the at least two first elastic arm portions 3261b. The first fastening portion 3261a is fastened to the end that is of the carrier 323 and that is close to the first opening 321a shown in FIG. 7. In some embodiments, refer to FIG. 22 and FIG. 23. The first fastening portion 3261a is an annular structure. The at least two first elastic arm portions 3261b are evenly arranged along the circumference of the carrier 323, one end of each of the at least two first elastic arm portions 3261b is connected to the first fastening portion 3261a, and the other end a1 of each of the at least two first elastic arm portions 3261b is fastened relative to the base body 325. In some embodiments, there are four first elastic arm portions 3261b. The other end a1 of each of the four first elastic arm portions 3261b are separately fastened to the first stop post 3252b, the second stop post 3252c, the third stop post 3252d, and the fourth stop post 3252e of the base body 325.

Figure 24:
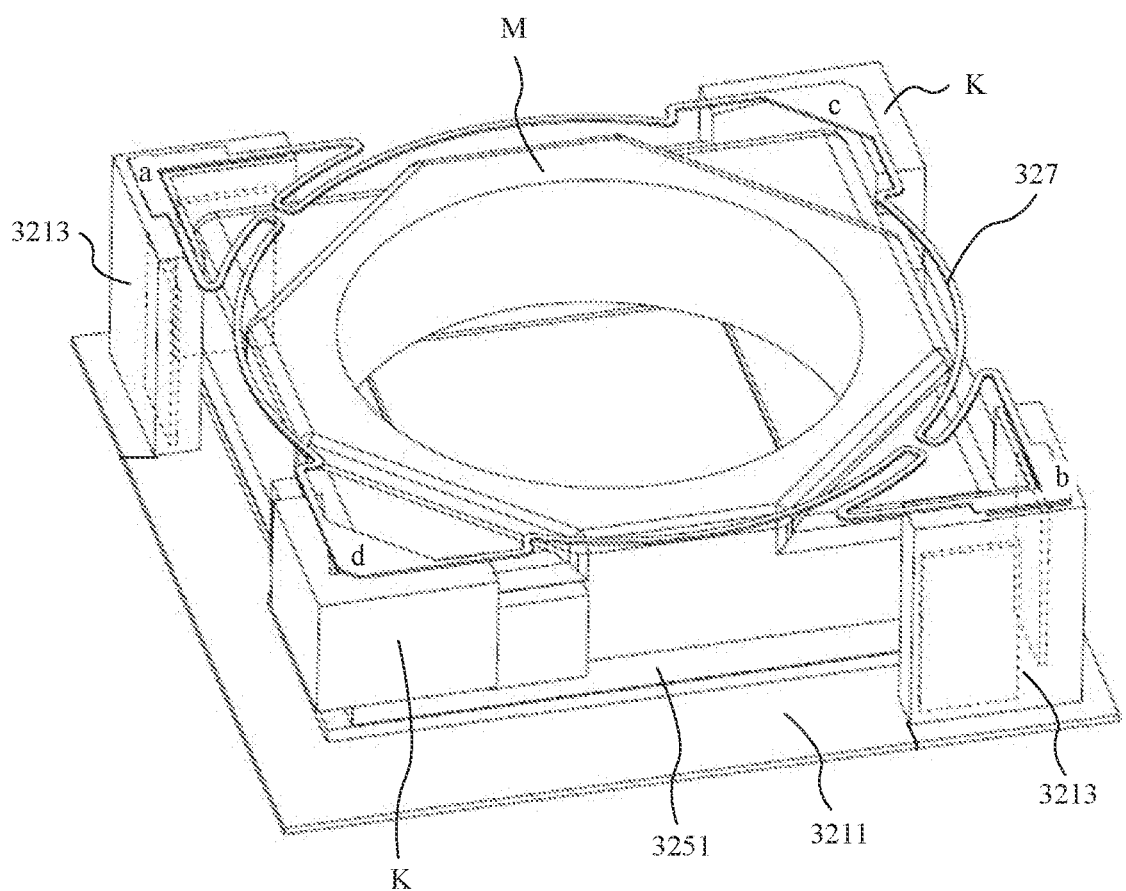
FIG. 24 is an assembly diagram of the assembly structure shown in FIG. 23, and a second elastic structure and a bottom plate.

Further, FIG. 24 is an assembly diagram of the assembly structure shown in FIG. 23, and a second elastic structure 327 and a bottom plate 2311. In this embodiment, the pan-tilt-zoom module further includes an enclosure unit M. The enclosure unit M is fastened to the base body 325. The carrier 323, the first elastic part 3261, the second elastic part 3262, and the focus adjustment component 328 in FIG. 23 are located in the enclosure unit M, and the focus adjustment component 328 can drive the carrier 323 to move in the enclosure unit M to implement auto focus. The second elastic structure 327 is located outside the enclosure unit M, and the second elastic structure 327 is connected between the enclosure unit M and the housing 321 in FIG. 7. In some embodiments, two fasteners K are fastened to the enclosure unit M by bonding, threading, clamping, or the like. The two fasteners K are located at two diagonal corners of the enclosure unit M. The two support posts 3213 on the bottom plate 2311 are disposed close to the other two diagonal corners of the enclosure unit M. The second elastic structure 327 is connected between the two fasteners K of the enclosure unit M and the two support posts 3213 on the housing 321. Specifically, the second elastic structure 327 has four ends a, b, c, and d, where the end a and the end b are respectively fastened to the two support posts 3213, and the end c and the end d are respectively fastened to the fasteners K.

In this way, the first elastic structure 326 and the second elastic structure 327 are different mechanical parts. When the carrier 323 moves relative to the base body 325 in the axial direction of the lens mounting hole 323a to implement auto focus, the first elastic structure 326 is bent and deformed, and locations of the second elastic structure 327 relative to the base body 325 and the bottom plate 3211 remain unchanged. When the base body 325 tilts toward any direction around to implement image stabilization compensation, locations of the first elastic structure 326 relative to the carrier 323 and the base body 325 remain unchanged, and the second elastic structure 327 is twisted. Therefore, there is no cross impact between auto focus motion and image stabilization compensation motion, and even if a loop closing detection apparatus is not disposed, high-precision auto focus driving and high-precision image stabilization compensation driving can be achieved.

The image stabilization component 329 is configured to drive the carrier 323 to tilt in the housing 321 along with the circuit board 330 in any direction around. When the carrier 323 and the circuit board 330 are relatively fastened to form a fixed-focus camera module, the image stabilization component 329 may be connected between the carrier 323 and the housing 321 in FIG. 7, to drive an entirety formed by connecting the carrier 323 to the circuit board 330 to tilt in any direction around. When the base body 325 and the focus adjustment component 328 are disposed between the carrier 323 and the circuit board 330, to form the auto focus camera module, the image stabilization component 329 may be connected between the base body 325 and the housing 321 in FIG. 7. In this case, the image stabilization component 329 can drive the base body 325 and drive the carrier 323 to tilt in any direction around. This application is described only by using an example in which the image stabilization component 329 is connected between the base body 325 and the housing 321 in FIG. 7. This cannot be considered as a special limitation on this application.

An end that is of the image stabilization component 329 and that is connected to the base body 325 may be directly connected to the base body 325, or may be indirectly connected to the base body 325 (for example, connected to the fastener K fastened to the base body 325). This is not specifically limited herein. Similarly, an end that is of the image stabilization component 329 and that is connected to the housing 321 in FIG. 7 may be directly connected to the housing 321, or may be indirectly connected to the housing 321 (for example, connected to the support post 3213 fastened to the housing 321). This is not specifically limited herein.

There are a plurality of structural forms of the image stabilization component 329. In some embodiments, the image stabilization component 329 is a voice coil motor drive apparatus including four magnetic parts and four coils. The four magnetic parts are respectively disposed on four inner side walls of the housing 321, and the four coils are respectively disposed on four outer side walls that are of the base body 325 and that are opposite to the four inner side walls. Alternatively, the four coils are respectively disposed on four inner side walls of the housing 321, and the four magnetic parts are respectively disposed on four outer side walls that are of the base body 325 and that are opposite to the four inner side walls. The base body 325 may be controlled to tilt in any direction around by conducting currents with different values and directions into the four coils. In the conventional technology, driving force of a drive structure including a magnetic part and a coil is small. On a premise of a specific weight of a load (including the base body 325, the carrier 323, the image sensor 324, the focus adjustment component 328, the first elastic structure 326, and the second elastic structure), sizes of the magnetic part and the coil need to be designed to be large, so as to provide adequate driving force to implement optical image stabilization. However, this cannot meet a small-sized design requirement of a pan-tilt-zoom module and a camera module.

Figure 25:
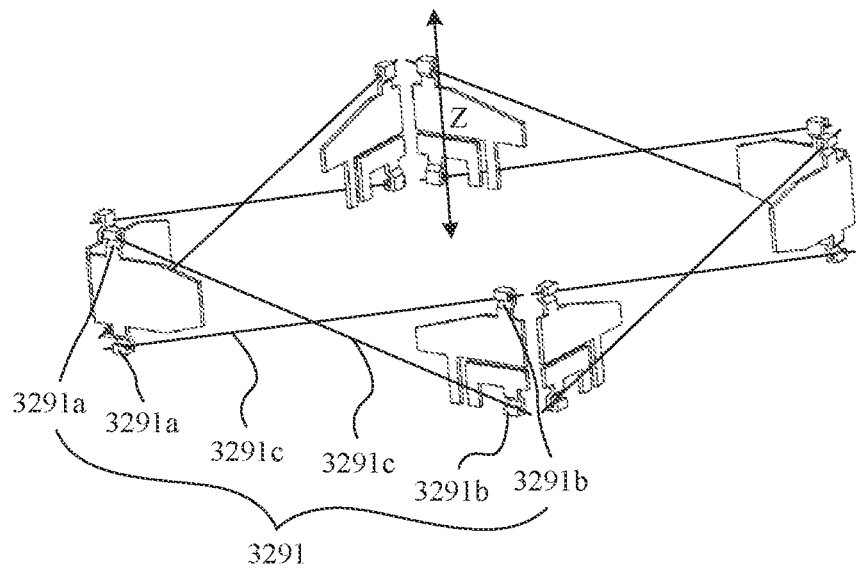
FIG. 25 is a schematic diagram of a structure of an image stabilization component in the pan-tilt-zoom module shown in FIG. 9.
Figure 26:
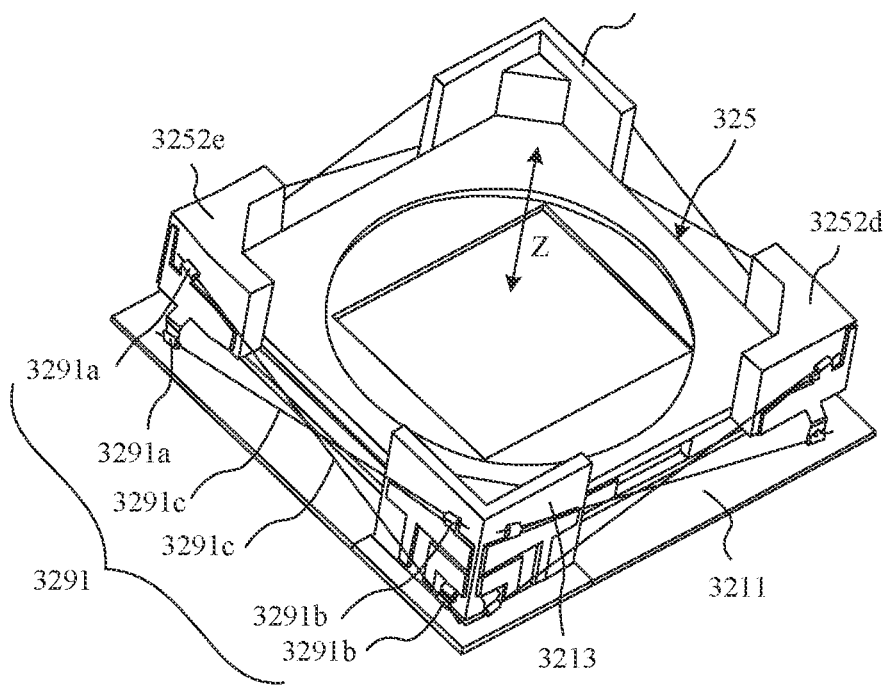
FIG. 26 is an assembly diagram of the image stabilization component shown in FIG. 25, and the base body and the bottom plate in FIG. 21.

To avoid the foregoing problem, in some embodiments of this application, a shape memory alloy (shape memory alloy, SMA) motor is used to implement optical image stabilization driving. In some embodiments, FIG. 25 is a schematic diagram of a structure of the image stabilization component 329 in the pan-tilt-zoom module 32 shown in FIG. 9, and FIG. 26 is an assembly diagram of the image stabilization component 329 shown in FIG. 25 and the base body 325 and the bottom plate 3211 in FIG. 21. In this embodiment, the image stabilization component is an SMA motor, and the image stabilization component 329 is connected between the base body 325 and the support post 3213 fastened to the housing 321. In some other embodiments, the image stabilization component 329 is connected between the two fasteners K in FIG. 24 and the support post 3213 fastened to the housing 321. An example in which the image stabilization component 329 shown in FIG. 26 is connected between the base body 325 and the support post 3213 fastened to the housing 321 is merely used for description below. This cannot be considered as a special limitation on this application.

Specifically, the image stabilization component 329 includes at least four groups of image stabilization units 3291 that are evenly arranged along a circumference of the base body 325. A quantity of the image stabilization units 3291 may be four groups, six groups, eight groups, or the like. This is not specifically limited herein. In this application, only an example in which the quantity of the image stabilization units 3291 is four groups is used for description. This cannot be considered as a special limitation on this application.

Each group of image stabilization units 3291 includes a pair of movable clamping jaws 3291a, a pair of fixed clamping jaws 3291b, and two SMA wires 3291c.

The pair of movable clamping jaws 3291a includes two movable clamping jaws 3291a, and the two movable clamping jaws 3291a are fastened relative to the base body 325. In some embodiments, the two movable clamping jaws 3291a are fastened to the third stop post 3252d or the fourth stop post 3252e of the base body 325 by bonding, clamping, screwing, or the like. A forming material of the movable clamping jaw 3291a may be a conductive material, or may be an insulation material. In some embodiments, the movable clamping jaw 3291a is made of a conductive material, for example, metal. In this way, the movable clamping jaw 3291a may be used as a wiring terminal of a first electrode of the SMA wire 3291c, to facilitate wiring of the SMA wire 3291c. The first electrode is one of a positive electrode and a negative electrode.

The pair of fixed clamping jaws 3291b includes two fixed clamping jaws 3291b, and the two fixed clamping jaws 3291b are fastened relative to the housing 321 in FIG. 7. In some embodiments, the two fixed clamping jaws 3291b are fastened to the support post 3213 of the bottom plate 3211 by bonding, clamping, screwing, or the like, so that the two fixed clamping jaws 3291b are fastened relative to the housing 321 in FIG. 7. A forming material of the fixed clamping jaw 3291b may be a conductive material, or may be an insulation material. In some embodiments, the fixed clamping jaw 3291b is made of a conductive material, for example, metal. In this way, the fixed clamping jaw 3291b may be used as a wiring terminal of a second electrode of the SMA wire 3291c, to facilitate wiring of the SMA wire 3291c. The second electrode is the other one of the positive electrode and the negative electrode.

The two movable clamping jaws 3291a in the pair of movable clamping jaws 3291a are spaced from each other in an axial direction (namely, a Z direction) of the lens mounting hole. In some embodiments, the two movable clamping jaws 3291a are connected as a whole. In this way, the pan-tilt-zoom module has a simple structure and is easy to assemble. The two fixed clamping jaws 3291b in the pair of fixed clamping jaws 3291b are spaced from each other in the axial direction of the lens mounting hole, and the two fixed clamping jaws 3291b are independent of each other, to facilitate separately supplying power to the two SMA wire wires 3291c. The movable clamping jaw 3291a and the fixed clamping jaw 3291b are spaced from each other in a circumferential direction of the base body 325.

The two SMA wire wires 3291c are cross-connected between the pair of movable clamping jaws 3291a and the pair of fixed clamping jaws 3291b. To be specific, in the two SMA wire wires 3291c, one SMA wire 3291c is connected between the movable clamping jaws 3291a close to the first opening 321a in FIG. 7 and the fixed clamping jaws 3291b away from the first opening 321a in FIG. 7, and the other SMA wire is connected between the movable clamping jaw 3291a away from the first opening 321a in FIG. 7 and the fixed clamping jaw 3291b close to the first opening 321a in FIG. 7. The SMA wire 3291c is a wire structure made of an SMA. The SMA is a nickel-titanium alloy material, and has heat-shrinking and cold-expanding characteristics. When no current is conducted to the SMA wire 3291c, the SMA wire 3291c is in a slack state. When the current flows into the SMA wire 3291c, the SMA wire 3291c converts a part of electric energy into heat due to a resistance characteristic, and the SMA wire 3291c shrinks under an action of the heat generated by the SMA wire 3291c, so as to apply pulling force to the third stop post 3252d and/or the fourth stop post 3252e of the base body 325.

In this way, when the carrier 323 in FIG. 21 moves relative to the base body 325 in the axial direction of the lens mounting hole 323a to implement auto focus, the current may be conducted to the SMA wire 3291c, so that the base body 325 keeps a location of the base body 325 relative to the bottom plate 3211 unchanged under pulling force of the SMA wire 3291c, so as to avoid movement of the base body 325 relative to the bottom plate 3211. In addition, currents with different values are conducted to different SMA wires 3291c in the image stabilization component 329, so that the base body 325 can be driven to tilt in any direction around, to implement optical image stabilization. When the current is cut off, the SMA wire 3291c is stretched by cold, and the second elastic structure may drive the base body 325 to reset, so that next image stabilization driving is not affected. The image stabilization component 329 is an 8-wire SMA motor. The image stabilization component 329 has a compact structure and large driving force, which helps reduce a size of the pan-tilt-zoom module.

Figure 27:
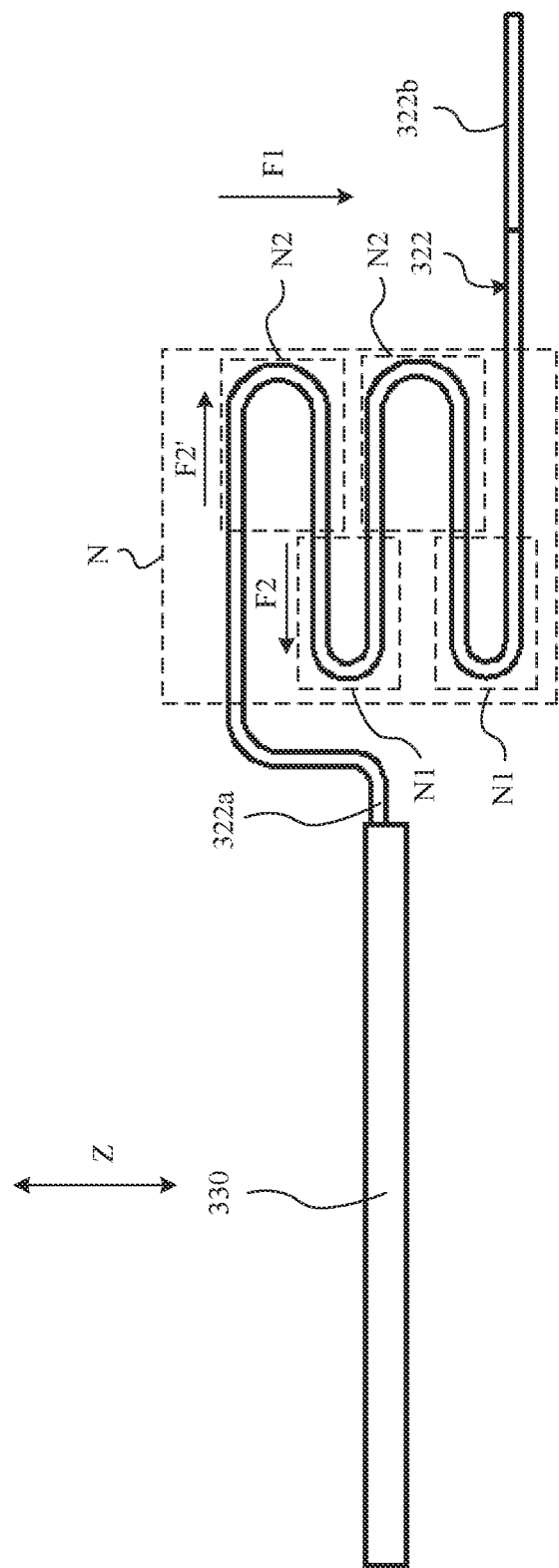
FIG. 27 is a schematic diagram of a structure of a connection between a circuit board in a pan-tilt-zoom module and an electrical connection structure according to some embodiments of this application.
Figure 28:
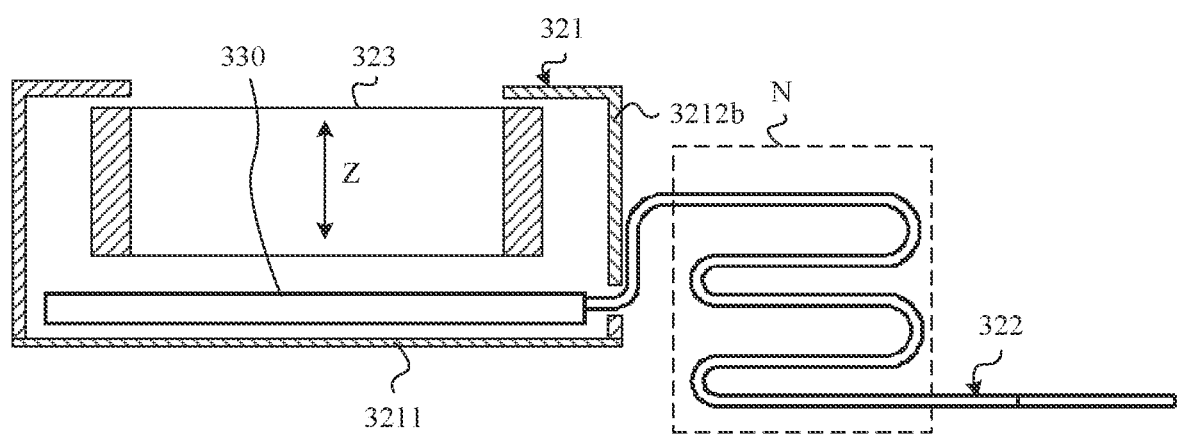
FIG. 28 is an assembly diagram of the circuit board and the electrical connection structure in FIG. 27, and a housing.

Refer back to FIG. 7 to FIG. 9, the pan-tilt-zoom module 32 further includes the electrical connection structure 322. The electrical connection structure 322 is configured to lead out an internal circuit of the pan-tilt-zoom module 32. Specifically, the electrical connection structure 322 has a first end 322a and a second end 322b. The first end 322a of the electrical connection structure 322 is electrically connected to the circuit board 330. The second end 322b of the electrical connection structure 322 is located outside the housing 321, and is configured to electrically connect to the calculation control unit of the electronic device. When the camera module 3 is mounted in the electronic device, and when the second end 322b of the electrical connection structure 322 is electrically connected to the calculation control unit, a location of the second end 322b of the electrical connection structure 322 is fixed in the electronic device. In view of this, the electrical connection structure 322 cannot affect a tilting movement of the circuit board 330 in any direction around. To achieve this objective, refer to FIG. 27. FIG. 27 is a schematic diagram of a structure of a connection between the circuit board 330 in the pan-tilt-zoom module and the electrical connection structure 322 according to some embodiments of this application. In this embodiment, the electrical connection structure 322 includes a snake-shaped extension segment N, and the snake-shaped extension segment N is in a free state, that is, the snake-shaped extension segment N is not fastened to any structure. The snake-shaped extension segment N is formed by alternately disposing a first bending section N1 and a second bending section N2 in a first direction F1 and connecting the first bending section N1 and the second bending section N2 in series. The first bending section N1 extends in the first direction F1, and arches in a second direction F2. The second bending section N2 extends in the first direction F1, and arches in a reverse direction F2' of the second direction F2. The first direction F1 is parallel to the axial direction (namely, the Z direction) of the lens mounting hole 323a in FIG. 9, and the second direction F2 is perpendicular to the first direction F1. An extension path of the first bending section N1 and the second bending section N2 may be of a "⌒" shape, or may be of a "∧" shape, or may be of a "n" shape, or the like. In the embodiment shown in FIG. 27, the extension path of the first bending section N1 and the second bending section N2 is of the "⌒" shape. The snake-shaped extension segment N has a movable margin that deforms in any direction around, and can allow the circuit board 330 to tilt in any direction around. However, because the snake-shaped extension segment N includes the first bending section N1 and the second bending section N2, and the first bending section N1 and the second bending section N2 are arranged in the first direction F1, an occupation height of the snake-shaped extension segment N in the first direction F1 is large. If the snake-shaped extension segment N is mounted between the circuit board 330 and the bottom plate 3211 in FIG. 9, a size of the pan-tilt-zoom module 32 in an upward Z direction is greatly increased. Therefore, the snake-shaped extension segment N of the electrical connection structure 322 is usually disposed outside the housing 321 of the pan-tilt-zoom module 32. FIG. 28 is an assembly diagram of the circuit board 330, the electrical connection structure 322, and the housing 321 in FIG. 27. In this embodiment, the snake-shaped extension segment N of the electrical connection structure 322 is located outside the side plate 3212b of the housing 321. In this case, the snake-shaped extension segment N further increases a board area occupied by the pan-tilt-zoom module 32 on the mainboard. In addition, to avoid interference between the snake-shaped extension segment N and other components around the pan-tilt-zoom module 32 when the snake-shaped extension segment N moves with the circuit board 330, a protective housing usually needs to be added outside the snake-shaped extension segment N. In this way, not only the board area occupied by the pan-tilt-zoom module 32 on the mainboard is increased, but also structural complexity and costs of the pan-tilt-zoom module 32 are increased.

Figure 29:
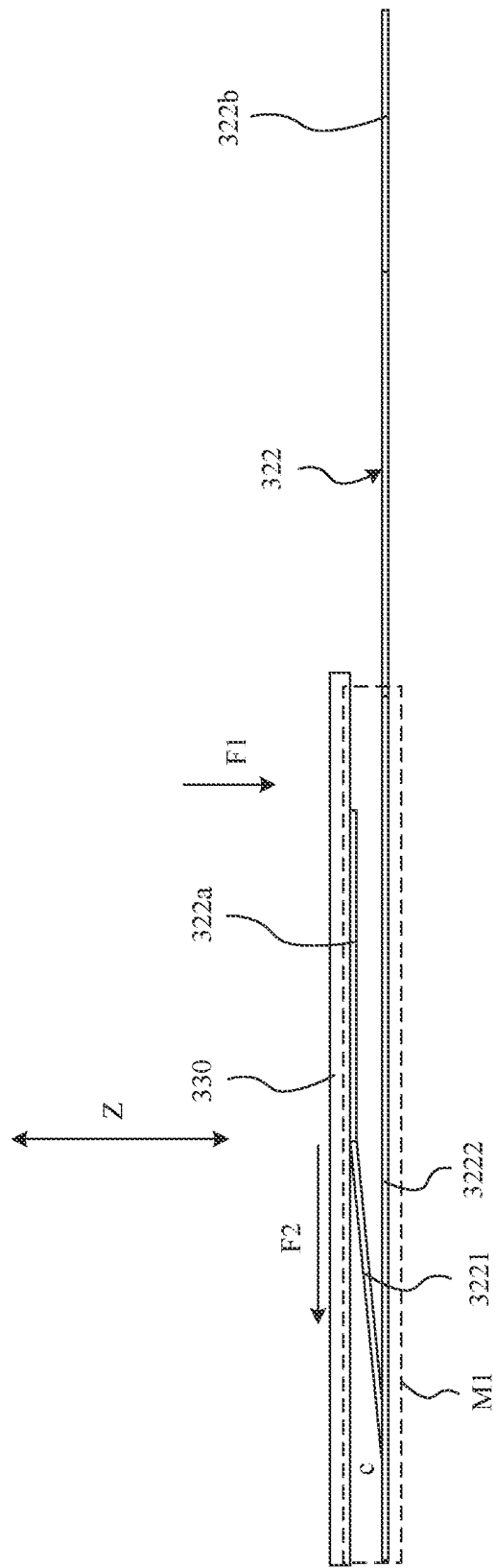
FIG. 29 is a schematic diagram of a structure of a connection between an electrical connection structure and a circuit board according to some embodiments of this application.

To resolve the foregoing problem, refer to FIG. 29. FIG. 29 is a schematic diagram of a structure of a connection between the electrical connection structure 322 and the circuit board 330 according to some embodiments of this application. In this embodiment, the electrical connection structure 322 is the electrical connection structure 322 in the pan-tilt-zoom module 32 shown in FIG. 7 to FIG. 9. The electrical connection structure 322 is a flexible structure. Specifically, the electrical connection structure 322 includes but is not limited to an FPC and a structure formed by connecting a plurality of conducting wires by using the flexible structure. In some embodiments, the electrical connection structure 322 is the FPC. The electrical connection structure 322 includes a bending section M1. The bending section M1 is in a free state, that is, the bending section M1 is not fastened to any other structure, and the bending section M1 extends in the first direction F1 and arches in the second direction F2. The first direction F1 is parallel to the axial direction (namely, the Z direction) of the lens mounting hole, and the second direction F2 is perpendicular to the first direction F1. The bending section M1 enables the circuit board 330 to flexibly swing around a first axis, where the first axis is perpendicular to both the first direction F1 and the second direction F2.

Specifically, an extension path of the bending section M1 may be of a "⌒" shape, or may be of a "∧" shape, or may be of a "n" shape, or the like. This is not specifically limited herein. In the embodiment shown in FIG. 28, the extension path of the bending section M1 is of the "∧" shape. This cannot be considered as a special limitation on this application.

Figure 30:
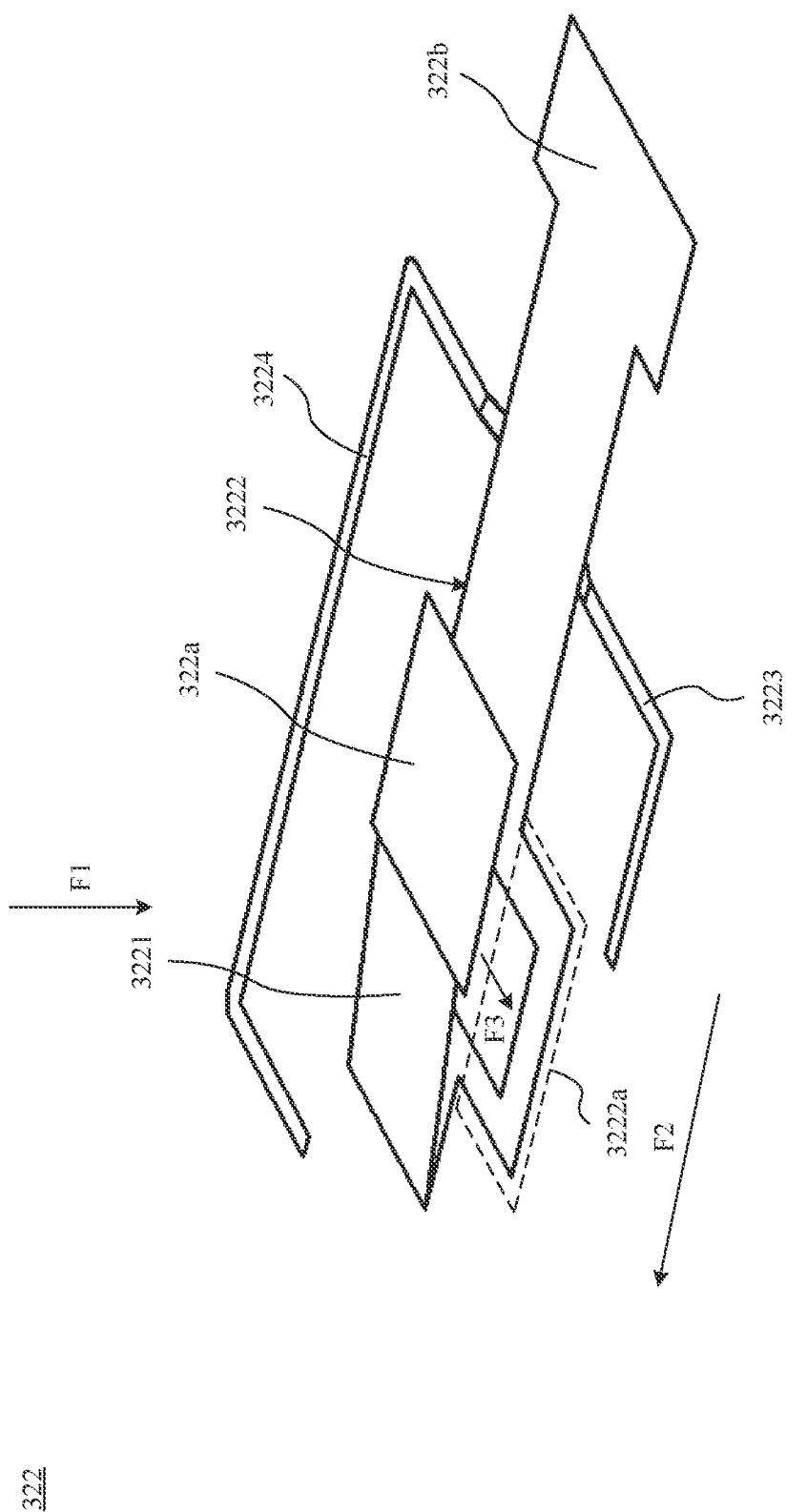
FIG. 30 is a three-dimensional diagram of the electrical connection structure in FIG. 29.

The bending section M1 includes a first side edge 3221 and a second side edge 3222 that are located at two sides of a highest arch point c. Further, FIG. 30 is a three-dimensional diagram of the electrical connection structure 322 in FIG. 29. At least one side edge (namely, at least one of the first side edge 3221 and the second side edge 3222) of the bending section includes a first bending unit 3222a. The first bending unit 3222a extends in the second direction F2, and arches in a third direction F3. In the embodiment shown in FIG. 30, the first bending unit 3222a is disposed on the second side edge 3222. Certainly, the first bending unit 3222a may alternatively be disposed on the first side edge 3221, or the first bending unit 3222a is disposed on both the first side edge 3221 and the second side edge 3222. The embodiment shown in FIG. 30 cannot be considered as a special limitation on this application. Specifically, an extension path of the first bending unit 3222a may be of a "∩" shape, or may be of a "∧" shape, or may be of a "n" shape, or the like. This is not specifically limited herein. In the embodiment shown in FIG. 30, the extension path of the first bending unit 3222a is of the "n" shape. This cannot be considered as a special limitation on this application. The third direction F3 is perpendicular to the first direction F1, and the third direction F3 is also perpendicular to the second direction F2. The first bending unit 3222a enables the circuit board 330 to flexibly swing around a second axis, where the second axis is parallel to the second direction F2, and the second axis is perpendicular to the first axis, so that the circuit board 330 can swing in any direction around. In addition, the first bending unit 3222a extends in a plane perpendicular to the first direction F1. Therefore, the first bending unit 3222a does not increase a height of the electrical connection structure 322 in the first direction F1. Therefore, the electrical connection structure 322 includes only one bending section (namely, the bending section M1) extending in the first direction F1, so as to achieve an objective of not interfering with the circuit board 330 tilting in any direction around. Therefore, the electrical connection structure 322 has a low height in the first direction F1. When the bending section M1 is mounted between the circuit board 330 and the bottom plate 3211 in FIG. 9, a height of the pan-tilt-zoom module 32 in the first direction F1 is less affected. In this way, the bending section M1 can be mounted between the circuit board 330 and the bottom plate 3211, so that the bending section M1 can be protected by using the housing 321 of the pan-tilt-zoom module 32, and there is no need to additionally dispose a protective housing. In addition, the board area occupied by the pan-tilt-zoom module 32 on a mainboard can be reduced.

Figure 31:
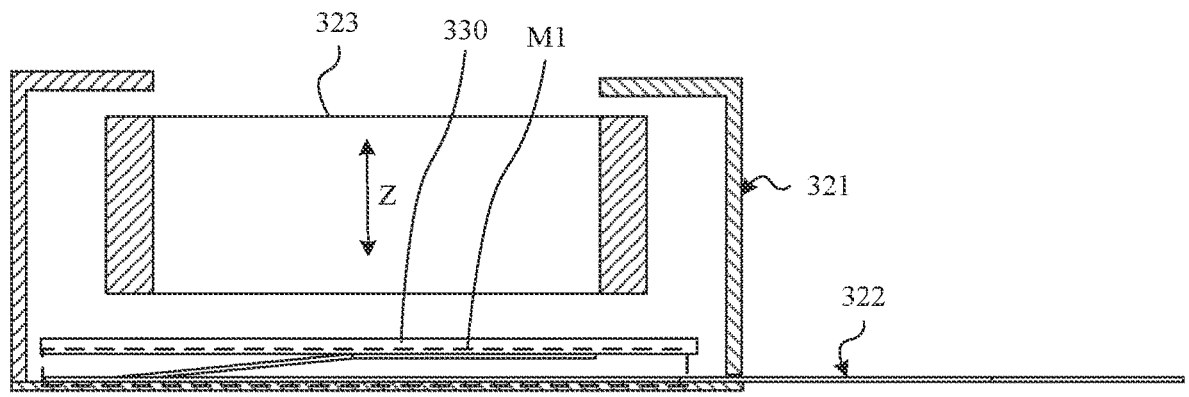
FIG. 31 is a schematic diagram of an assembly structure of the circuit board and the electrical connection structure in FIG. 29, a housing in FIG. 7, and a carrier in FIG. 9.

Specifically, in some embodiments, FIG. 31 is a schematic diagram of an assembly structure of the circuit board 330 and the electrical connection structure 322 in FIG. 29, the housing 321 in FIG. 7, and the carrier 323 in FIG. 9. The bending section M1 is located in the housing 321, the bending section M1 is located on a side that is of the circuit board 330 and that is away from the carrier 323, and an orthographic projection region of the bending section M1 on the circuit board 330 overlaps the circuit board 330. In some embodiments, refer to FIG. 31. The orthographic projection region of the bending section M1 on the circuit board 330 is located in the circuit board 330. In this way, the bending section M1 may be protected by using the housing 321, and there is no need to additionally dispose a protective housing for the bending section M1. In addition, the board area occupied by the pan-tilt-zoom module 32 on the mainboard can be reduced.

Figure 32:
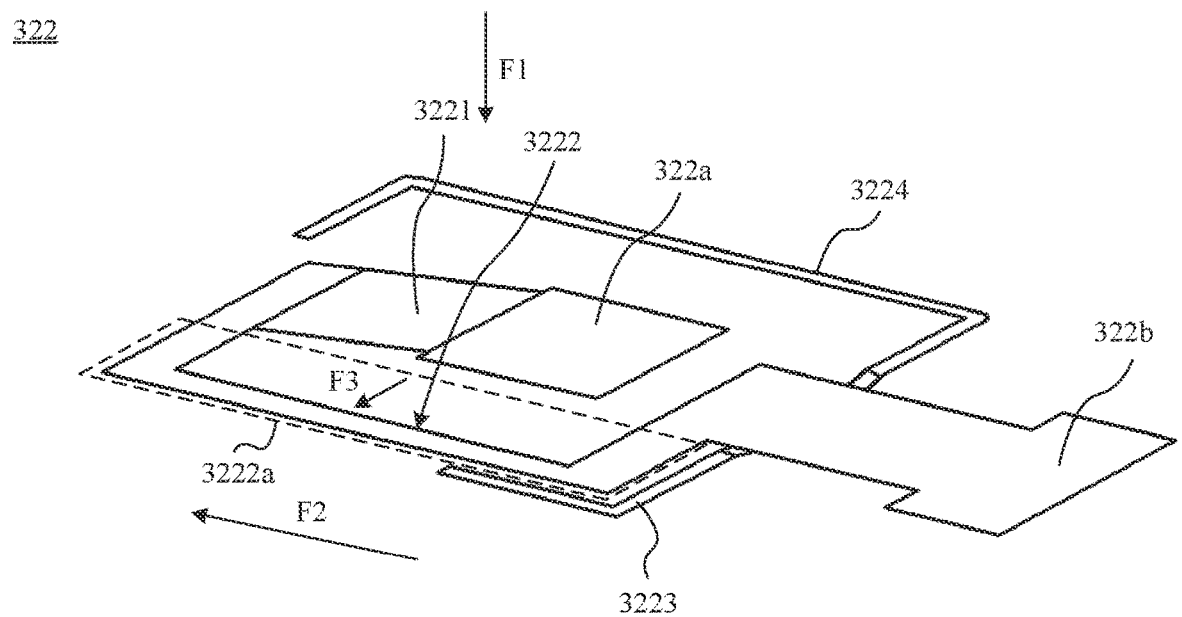
FIG. 32 is another three-dimensional diagram of the electrical connection structure in FIG. 29.

FIG. 32 is another three-dimensional diagram of the electrical connection structure 322 in FIG. 29. In this embodiment, orthographic projection regions of two side edges (namely, the first side edge 3221 and the second side edge 3222) of the bending section M1 on the circuit board 330 in FIG. 29 do not overlap. In this way, on the premise of a specific height of the bending section M1 in the first direction F1, a movement angle of the first side edge 3221 relative to the second side edge 3222 can be increased, and an amplitude of the circuit board 330 swinging around the first axis can be increased. On the premise of a specific movement angle of the first side edge 3221 relative to the second side edge 3222, the height of the bending section M1 in the first direction F1 can be further reduced.

Figure 33:
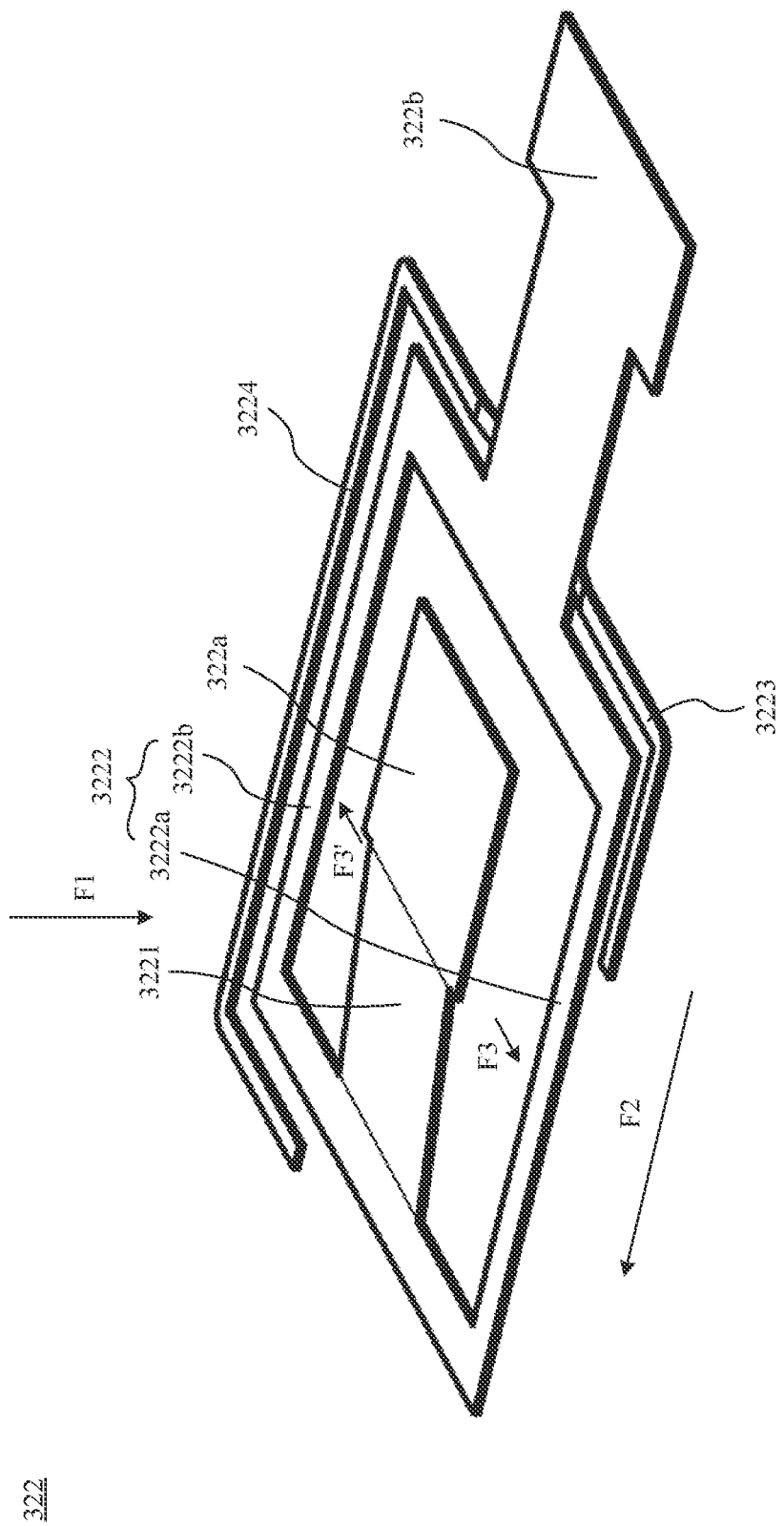
FIG. 33 is still another three-dimensional diagram of the electrical connection structure in FIG. 29.

In some embodiments, FIG. 33 is still another three-dimensional diagram of the electrical connection structure 322 in FIG. 29. In this embodiment, the first bending unit 3222a is disposed on a side edge (namely, the second side edge 3222) that is of the bending section M1 and that is away from the carrier 323 in FIG. 9. The second side edge 3222 further includes a second bending unit 3222b. The second bending unit 3222b and the first bending unit 3222a are disposed in parallel, and the second bending unit 3222b protrudes in a reverse direction F3' of the third direction F3. In this way, the second bending unit 3222b does not interfere with the circuit board 330 flexibly swinging around the second axis, and signal transmission between the first end 322a and the second end 322b is implemented through the two parallel electrical connection paths of the first bending unit 3222a and the second bending unit 3222b. This helps reduce a set width of a single electrical connection path, to further improve twistability performance of the electrical connection structure 322.

In the foregoing embodiment, an extension path of the second bending unit 3222b may be of a "∩" shape, or may be of a "∧" shape, or may be of a "n" shape. This is not specifically limited herein. In the embodiment shown in FIG. 33, the extension path of the second bending unit 3222b is of the "n" shape. This cannot be considered as a special limitation on this application.

In some embodiments, the second bending unit 3222b and the first bending unit 3222a are symmetrically disposed. In this way, aesthetics of the electrical connection structure 322 can be improved, and difficulty in manufacturing the electrical connection structure 322 can be reduced.

Still refer to FIG. 30, FIG. 32, or FIG. 33. The electrical connection structure 322 further includes a first electrical connection arm 3223 and a second electrical connection arm 3224. In some embodiments, both the first electrical connection arm 3223 and the second electrical connection arm 3224 are fastened relative to the bottom plate 3211. In addition, one end of each of the first electrical connection arm 3223 and the second electrical connection arm 3224 is electrically connected to the bending section, and the other end of each of the first electrical connection arm 3223 and the second electrical connection arm 3224 is separately electrically connected to the fixed clamping jaw 3291b fastened to the two support posts 3213 in FIG. 26. In view of this, still refer to FIG. 26. The movable clamping jaw 3291a fastened to the third stop post 3252d and the fourth stop post 3252e is electrically connected to the first elastic part 3261 in FIG. 21 respectively, so that polarities of the movable clamping jaw 3291a are led back to the two support posts 3213 by using the first elastic part 3261. In some embodiments, conductive parts (not shown in the figure) are embedded in the two support posts 3213, one end of the conductive part in the two support posts 3213 is electrically connected to the first elastic part 3261, and the other end of the conductive part in the two support posts 3213 is electrically connected to the first electrical connection arm 3223 and the second electrical connection arm 3224 separately. In this way, the polarity of the movable clamping jaw 3291a is led back to the electrical connection structure 322. In this way, the image stabilization drive signal can be provided to the image stabilization component 329 by using the electrical connection structure 322.

In addition to introducing the image stabilization drive signal to the image stabilization component 329, the electrical connection structure 322 may be configured to: introduce a focus drive signal to the circuit board 330, and further transmit the focus drive signal to the coil 3282 by using the circuit board 330. The electrical connection structure 322 is further configured to: transmit an image signal collected by the image sensor 324 to the calculation control unit, and further perform image processing by using the calculation control unit.

In the descriptions of this specification, the described specific features, structures, materials, or characteristics may be combined in a proper manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A pan-tilt-zoom device, comprising:
   a housing comprising:
      an accommodating cavity; and
      a first opening in communication with the accommodating cavity;
   a carrier located in the accommodating cavity and comprising a lens mounting hole, wherein the lens mounting hole comprises:
      a carrier side;
      a first carrier end having a first lens mount opening that faces the first opening; and
      a second carrier end having a second lens mount opening;
   an image sensor located in the accommodating cavity and disposed on the carrier side and away from the first opening, wherein the image sensor comprises a photosensitive surface that faces the second lens mount;
   a shape memory alloy (SMA) motor configured to drive the carrier with the image sensor to tilt for optical image stabilization;
   a circuit board, wherein the image sensor is fastened to the circuit board; and
   an electrical connection structure comprising:
      a first structure end electrically connected to the circuit board;
      a second structure end located outside the housing; and
      a bending section comprising:
         a first bending section side edge comprising a first bending unit that extends in a second direction and arches in a third direction; and
         a second bending section side edge,
         wherein the bending section extends in a first direction and arches in the second direction, wherein the bending section is in a free state, wherein the first direction is parallel to an axial direction of the lens mounting hole, wherein the second direction is perpendicular to the first direction, wherein the third direction is perpendicular to the first direction, and wherein the third direction is perpendicular to the second direction.

2. The pan-tilt-zoom device of claim 1, wherein the circuit board is located in the accommodating cavity, wherein the bending section is located in the accommodating cavity on a side of the circuit board that is opposite the carrier, and wherein the circuit board overlaps the bending section.

3. The pan-tilt-zoom device of claim 1, wherein the first bending section side edge and the second bending section side edge do not overlap.

4. The pan-tilt-zoom device of claim 1, wherein the first bending unit is disposed away from the carrier, wherein the second bending section side edge further comprises a second bending unit, wherein the second bending unit and the first bending unit are disposed in parallel, and wherein the second bending unit protrudes in a reverse direction of the third direction.

5. The pan-tilt-zoom device of claim 4, wherein the second bending unit and the first bending unit are symmetrically disposed.

6. The pan-tilt-zoom device of claim 1, further comprising:
   a base body located on the carrier side and away from the first opening, wherein the image sensor is fastened to the base body, and wherein the SMA motor is coupled between the base body and the housing; and
   a focus adjustment component connected between the carrier and the base body, wherein the focus adjustment component is configured to drive the carrier to move in the axial direction of the lens mounting hole relative to the base body.

7. The pan-tilt-zoom device of claim 6, further comprising a first elastic structure coupled between the carrier and the base body, wherein the first elastic structure elastically supports the carrier on the base body.

8. The pan-tilt-zoom device of claim 7, wherein the first carrier end is proximate to the first opening, wherein the second carrier end is away from the first opening, and wherein the first elastic structure comprises:
   a first elastic part connected between the first carrier end and the base body; and
   a second elastic part connected between the second carrier end and the base body.

9. The pan-tilt-zoom device of claim 8, wherein the first elastic part comprises:
   a first fastening portion fastened to the first carrier end; and
   at least two first elastic arm portions evenly arranged along a circumference of the carrier, wherein each of the at least two first elastic arm portions comprises:
      a first elastic arm end connected to the first fastening portion; and
      a second elastic arm end fastened to the base body.

10. The pan-tilt-zoom device of claim 9, further comprising a second elastic structure connected between the base body and the housing, wherein the second elastic structure elastically supports the base body in the housing.

11. The pan-tilt-zoom device of claim 10, wherein the first elastic part further comprises at least two second elastic arm portions evenly arranged along the circumference of the carrier, wherein each of the at least two second elastic arm portions comprises:
   a third elastic arm end connected to the first fastening portion; and
   a fourth elastic arm end fastened to the housing, and
   wherein the first elastic part forms the second elastic structure.

12. The pan-tilt-zoom device of claim 10, further comprising an enclosure unit fastened to the base body and enclosing the carrier, the focus adjustment component, and the first elastic structure, wherein the second elastic structure is located outside the enclosure unit and is connected between the enclosure unit and the housing.

13. A camera device, comprising:
a pan-tilt-zoom device comprising:
a housing comprising:
an accommodating cavity; and
a first opening in communication with the accommodating cavity;
a carrier located in the accommodating cavity and comprising a lens mounting hole, wherein the lens mounting hole comprises:
a carrier side;
a first carrier end proximate to the first opening and having a first lens mount opening that faces the first opening; and
a second carrier end located away from the first opening and having a second lens mount opening;
an image sensor located in the accommodating cavity and disposed on the carrier side and away from the first opening, wherein the image sensor comprises a photosensitive surface that faces the second lens mount;
a shape memory alloy (SMA) motor configured to drive the carrier and the image sensor to tilt for optical image stabilization;
a base body located on the carrier side and away from the first opening, wherein the image sensor is fastened to the base body, and wherein the SMA motor is coupled between the base body and the housing;
a focus adjustment component connected between the carrier and the base body, wherein the focus adjustment component is configured to drive the carrier to move in an axial direction of the lens mounting hole relative to the base body; and
a first elastic structure coupled between the carrier and the base body, wherein the first elastic structure elastically supports the carrier on the base body and comprises:
a first elastic part connected between the first carrier end and the base body; and
a second elastic part connected between the second carrier end and the base body; and
a lens mounted in the lens mounting hole and comprising:
a light inlet end located in the first opening and having an avoidance gap between the light inlet end and an edge of the housing at the first opening; and
a light outlet end having an end face that is opposite to the photosensitive surface of the image sensor.

14. An electronic device, comprising:
a camera device comprising:
a pan-tilt-zoom device comprising:
a housing comprising:
an accommodating cavity; and
a first opening in communication with the accommodating cavity;
a carrier located in the accommodating cavity and comprising a lens mounting hole, wherein the lens mounting hole comprises:
a carrier side;
a first carrier end having a first lens mount opening that faces the first opening; and
a second carrier end having a second lens mount opening;
an image sensor located in the accommodating cavity and disposed on the carrier side and away from the first opening, wherein the image sensor comprises a photosensitive surface that faces the second lens mount; and
a shape memory alloy (SMA) motor configured to drive the carrier and the image sensor to tilt for optical image stabilization; and
a lens mounted in the lens mounting hole and comprising:
a light inlet end located in the first opening and having an avoidance gap between the light inlet end and an edge of the housing at the first opening, and opening; and
a light outlet end having an end face that is opposite to the photosensitive surface of the image sensor;
a shake detector configured to detect shake information of the electronic device;
a calculation controller electrically connected to the shake detector and the camera device, wherein the calculation controller is configured to:
calculate an image stabilization compensation amount based on the shake information detected by the shake detector; and
control, based on the image stabilization compensation amount, the SMA motor to drive the lens to perform a tilting movement along with the image sensor;
a circuit board, wherein the image sensor is fastened to the circuit board; and
an electrical connection structure comprising:
a first structure end electrically connected to the circuit board;
a second structure end located outside the housing; and
a bending section comprising:
a first bending section side edge comprising a first bending unit that extends in a second direction and arches in a third direction; and
a second bending section side edge,
wherein the bending section extends in a first direction and arches in the second direction, wherein the bending section is in a free state, wherein the first direction is parallel to an axial direction of the lens mounting hole, wherein the second direction is perpendicular to the first direction, wherein the third direction is perpendicular to the first direction, and wherein the third direction is perpendicular to the second direction.

15. The electronic device of claim 14, wherein the circuit board is located in the accommodating cavity, wherein the bending section is located in the accommodating cavity on a side that is proximate to the circuit board and that is away from the carrier, and wherein the circuit board overlaps the bending section.

16. The electronic device of claim 14, wherein the first bending section side edge and the second bending section side edge do not overlap.

17. The electronic device of claim 14, wherein the first bending unit is disposed away from the carrier, wherein the second bending section side edge further comprises a second bending unit, wherein the second bending unit and the first bending unit are disposed in parallel, and wherein the second bending unit protrudes in a reverse direction of the third direction.

18. The electronic device of claim 14, wherein the first bending section side edge and the second bending section side edge are symmetrically disposed.

19. The electronic device of claim 14, wherein the pan-tilt-zoom device further comprises:

a base body located on the carrier side and away from the first opening, wherein the image sensor is fastened to the base body, and wherein the SMA motor is coupled between the base body and the housing; and a focus adjustment component connected between the carrier and the base body, wherein the focus adjustment component is configured to drive the carrier to move in the axial direction of the lens mounting hole relative to the base body.

20. The electronic device of claim 19, wherein the pan-tilt-zoom device further comprises a first elastic structure coupled between the carrier and the base body, wherein the first elastic structure elastically supports the carrier on the base body.

* * * * *